(12) United States Patent
Laurence et al.

(10) Patent No.: US 9,499,189 B2
(45) Date of Patent: Nov. 22, 2016

(54) SNOWMOBILE SKI ASSEMBLY

(71) Applicant: BOMBARDIER RECREATIONAL PRODUCTS INC., Valcourt (CA)

(72) Inventors: Felix-Antoine Laurence, Magog (CA); Melanie Desjarlais, Valcourt (CA); Luc Dufort, Valcourt (CA); Bertrand Mallette, Rock Forest (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/662,158

(22) Filed: Mar. 18, 2015

(65) Prior Publication Data

US 2015/0314799 A1     Nov. 5, 2015

Related U.S. Application Data

(60) Provisional application No. 61/986,593, filed on Apr. 30, 2014.

(51) Int. Cl.
*B62B 17/02*     (2006.01)
*B62M 27/02*     (2006.01)

(52) U.S. Cl.
CPC ......... *B62B 17/02* (2013.01); *B62M 2027/025* (2013.01)

(58) Field of Classification Search
CPC ...... B62B 17/02; B62B 17/04; B62M 27/02; B62M 2027/025

USPC .............................................. 280/26, 27, 28
See application file for complete search history.

(56) References Cited

U.S. PATENT DOCUMENTS

| | | | | |
|---|---|---|---|---|
| 2,741,487 A * | 4/1956 | Carefoot | ................. | B62B 17/02 280/28 |
| 3,632,126 A * | 1/1972 | Shorrock | ................ | B62B 13/08 280/28 |
| 3,645,347 A * | 2/1972 | Brant | ...................... | B62B 13/08 180/182 |
| 3,711,109 A * | 1/1973 | Hofbauer | ................ | B62B 17/04 180/182 |
| 3,866,933 A * | 2/1975 | Mollring | ................. | B62B 13/08 180/182 |
| 3,870,331 A * | 3/1975 | Cryderman | ............. | B62B 17/02 180/182 |

(Continued)

FOREIGN PATENT DOCUMENTS

| CA | 220836 A | 7/1922 |
|---|---|---|
| CA | 232374 A | 7/1923 |

(Continued)

*Primary Examiner* — Hau Phan
*Assistant Examiner* — Jacob Meyer
(74) *Attorney, Agent, or Firm* — BCF LLP

(57) ABSTRACT

A snowmobile ski assembly has a ski defining a slot, a ski runner disposed in the slot and being translatable in the slot between a first position and a second position, and a runner adjustment assembly connected to the ski runner. The runner adjustment assembly selectively translates the ski runner between the first and second positions. A snowmobile having the snowmobile ski assembly and a ski runner are also disclosed.

42 Claims, 22 Drawing Sheets

(56) References Cited

U.S. PATENT DOCUMENTS

| | | | |
|---|---|---|---|
| 4,291,892 A * | 9/1981 | Berthold | B62B 13/06 180/182 |
| 5,474,146 A * | 12/1995 | Yoshioka | B62K 13/00 180/184 |
| 6,705,620 B2 * | 3/2004 | Bruns | B62B 17/02 280/28 |
| 6,971,653 B2 * | 12/2005 | Takahiko | B62M 27/02 180/182 |
| 7,040,634 B1 * | 5/2006 | Elkins, Jr. | A63C 5/031 280/14.25 |
| 7,185,897 B2 | 3/2007 | Musselman | |
| 7,264,250 B2 | 9/2007 | Lachance | |
| 7,287,763 B1 * | 10/2007 | Beaudoin | B62B 17/02 280/11.12 |
| 7,497,447 B2 | 3/2009 | Musselman | |
| 7,614,627 B2 | 11/2009 | Musselman | |
| 8,029,004 B2 * | 10/2011 | Lemieux | B62B 17/04 180/182 |
| 8,240,417 B2 * | 8/2012 | Takata | B62D 3/00 180/190 |
| 8,793,875 B2 | 8/2014 | Musselman | |
| 2001/0013687 A1 * | 8/2001 | Cormican | B62B 17/02 280/28 |
| 2003/0151216 A1 * | 8/2003 | Takahiko | B62M 27/02 280/28 |
| 2003/0189302 A1 | 10/2003 | Makitalo | |
| 2013/0228988 A1 | 9/2013 | Handfield et al. | |
| 2015/0314800 A1 * | 11/2015 | Laurence | B62B 17/02 280/28 |

FOREIGN PATENT DOCUMENTS

| | | |
|---|---|---|
| CA | 253557 A | 9/1925 |
| CA | 517048 A | 10/1955 |
| CA | 828641 A | 12/1969 |
| CA | 897747 A | 4/1972 |
| CA | 898310 A | 4/1972 |
| CA | 955292 A | 9/1974 |
| CA | 960729 A | 1/1975 |
| CA | 2560240 A1 | 3/2008 |
| CA | 2566598 C | 9/2013 |
| CA | 2809170 A1 | 9/2013 |

* cited by examiner

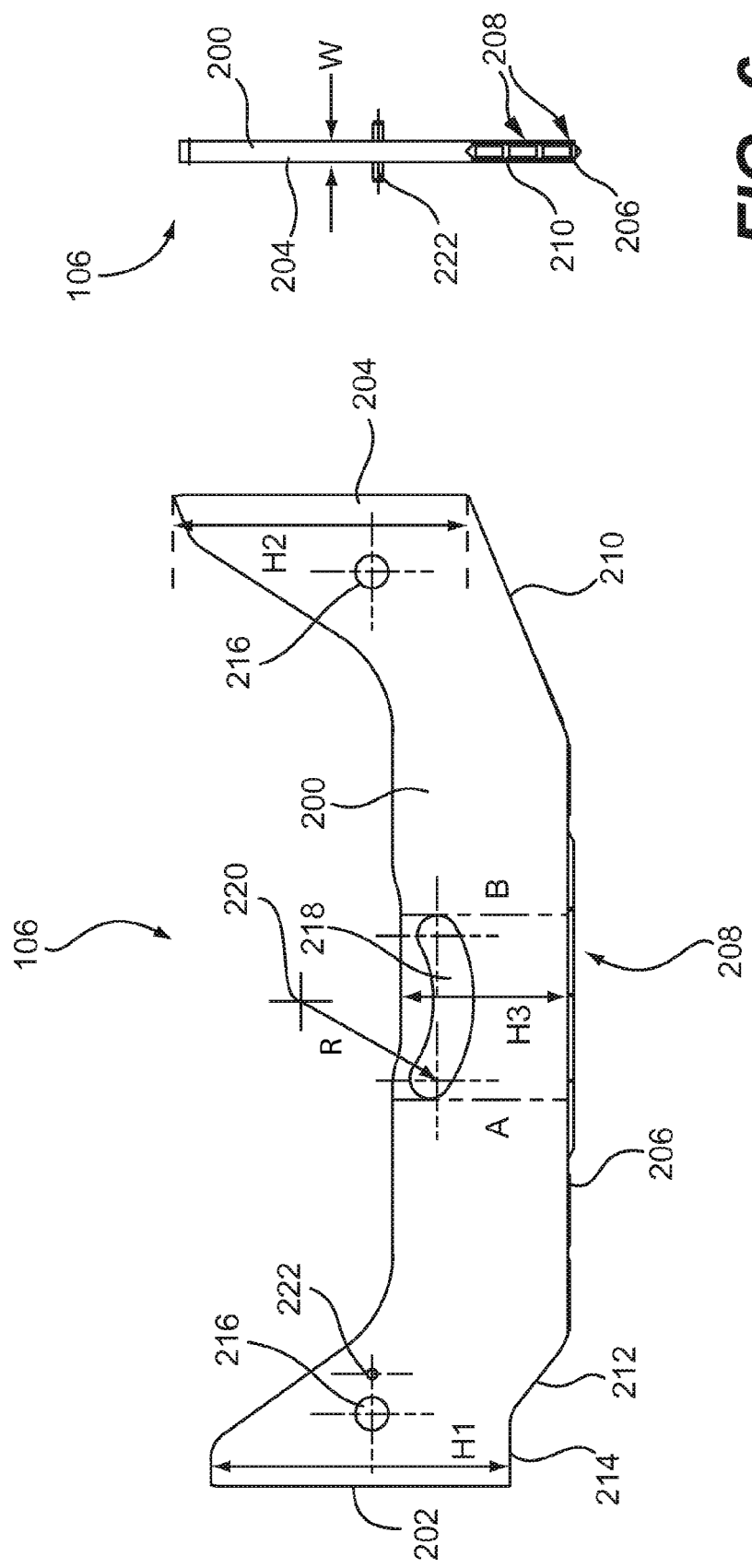

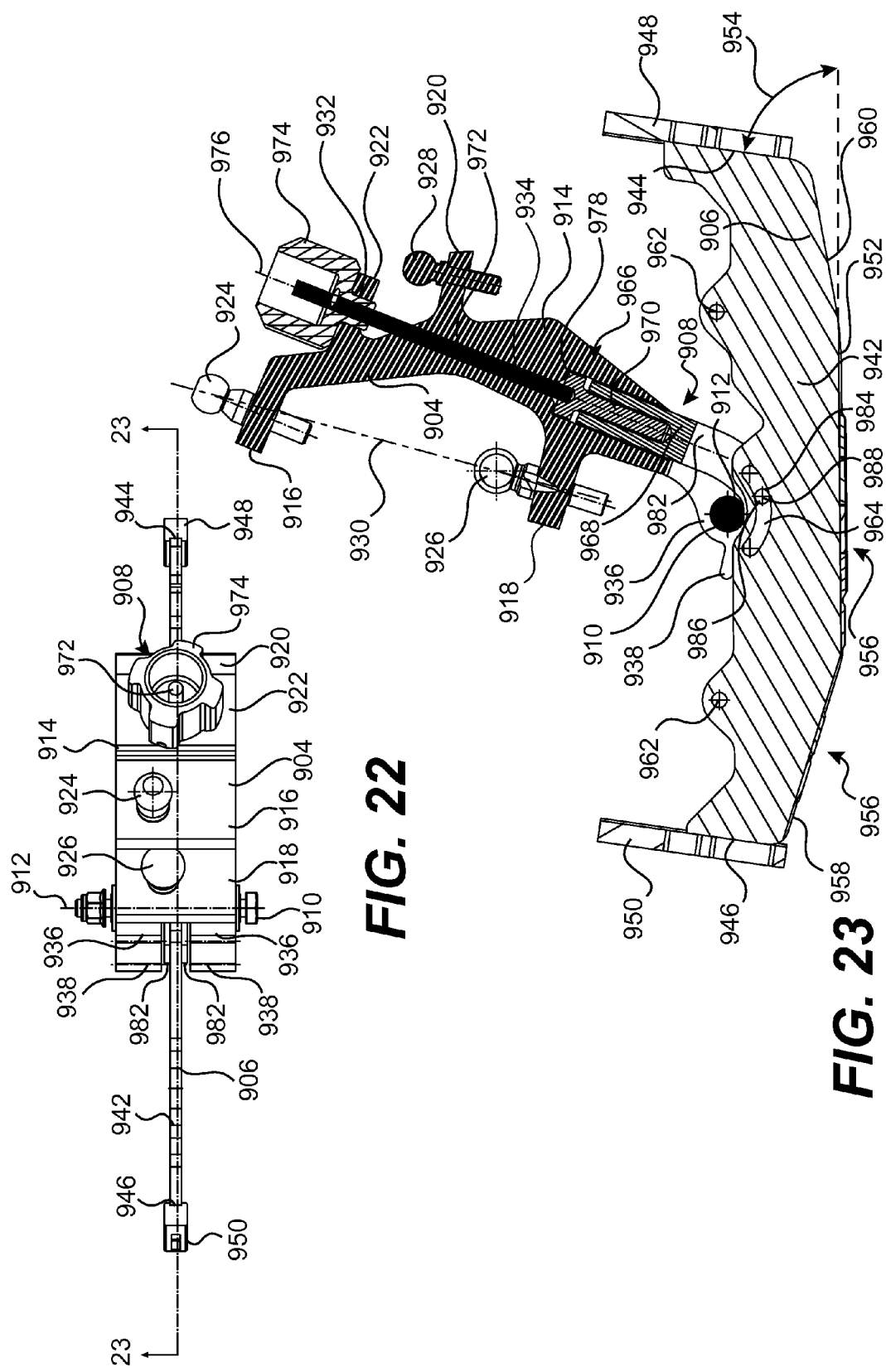

SNOWMOBILE SKI ASSEMBLY

CROSS-REFERENCE

The present application claims priority of U.S. Provisional Patent Application No. 61/986,593, filed Apr. 30, 2014, the entirety of which is incorporated herein by reference.

TECHNICAL FIELD

The present technology relates to snowmobile ski assemblies.

BACKGROUND

Snowmobiles skis are typically provided with keels extending below to aid in steering of the snowmobile. Steering effectiveness and responsiveness of the steering assembly tend to be greater for deeper keels. Deeper keels are therefore desired for aggressive riding of the snowmobile or when the riding surface is covered with soft-packed snow so the keel can extend down through the soft-packed snow into the harder-packed snow. However, deeper keels also increase the load on the steering assembly, and on the driver controlling the handlebar of the steering assembly when riding on hard-packed snow or ice. In situations such as on longer rides, or where less aggressive riding is desired, it may be desirable to have skis with keels of a reduced depth. It is however inconvenient to replace the snowmobile skis according to changes in load requirements and riding conditions, especially since the changes may occur while riding.

To help prevent wear of the keels of the skis and to assist in steering on hard-packed snow or ice, metallic ski runners are usually provided against the bottom of the keels. One solution that has been proposed to address the problem of having to replace the skis to have different keel heights depending on the riding conditions consists in providing a system for adjusting the distance by which the ski runners extend from the bottom of the ski.

Some prior art ski assemblies having adjustable ski runners have the ski runner being pivotally connected at a front of the ski runner and a device to move the rear end of the ski runner in or out of the ski. As would be understood, as a result of the adjustment, the angle between the ski runner and the bottom of the ski varies, which, in some conditions, may be undesirable.

Other prior art ski assemblies having adjustable ski runners, such as the one described in U.S. Pat. No. 2,741,487, issued Apr. 10, 1956, have devices at the front and rear of the ski runner to move the ski runner in and out of the ski. However, the multiple devices make it difficult to maintain the orientation of the ski runner relative to the ski during adjustment. Also, the multiple devices make the adjustment complex and lengthy, especially if one desires to have the same adjustment on both skis of the snowmobile. Finally, systems like those described in U.S. Pat. No. 2,741,487 require the use of tools to make the adjustment of the ski runner, which can be inconvenient if one desires to make the adjustment at some point during a snowmobile ride in cold weather.

Therefore, there is a desire for a ski assembly for a snowmobile that can be adjusted for operation of the snowmobile in different riding conditions.

SUMMARY

One object of the present technology is to ameliorate at least some of the inconveniences of the prior art.

According to an aspect of the present technology, there is provided a snowmobile ski assembly having a ski runner that can be adjusted to protrude more or less from a bottom of the ski of the ski assembly. By changing the amount by which the ski runner protrudes from the ski, the ski assembly can be adapted to different riding conditions.

According to another aspect of the present technology, there is provided a snowmobile ski assembly having a ski defining a slot, a ski runner disposed in the slot, the ski runner being translatable in the slot relative to the ski, the ski runner being translatable between a first position and a second position, a bottom of the ski runner being closer to a bottom of the ski in the first position than in the second position, and a runner adjustment assembly connected to the ski runner. The runner adjustment assembly selectively translates the ski runner between the first and second positions.

In some implementations of the present technology, the ski runner is held in place relative to the ski by the runner adjustment assembly.

In some implementations of the present technology, the ski runner remains rotationally fixed relative to the ski as the ski runner translates between the first and second position.

In some implementations of the present technology, the ski pivots about a laterally extending ski pivot axis. The runner adjustment assembly is connected about the ski pivot axis. The ski is pivotable about the ski pivot axis relative to the runner adjustment assembly.

In some implementations of the present technology, a ski leg is connected about the ski pivot axis. The ski is pivotable about the ski pivot axis relative to the ski leg.

In some implementations of the present technology, the runner adjustment assembly is disposed closer to a front of the ski than the ski leg.

In some implementations of the present technology, the ski runner translates along a translation axis between the first and second positions. The ski leg is pivotable about a ski leg pivot axis for steering the snowmobile ski assembly. The ski leg pivot axis is angled relative to the translation axis when a snowmobile provided with the snowmobile ski assembly is disposed on flat, level ground.

In some implementations of the present technology, the runner adjustment assembly has a connector connected to the ski runner and defining a laterally extending runner connection axis. The runner connection axis is disposed vertically below the ski pivot axis.

In some implementations of the present technology, the ski runner translates along a translation axis between the first and second positions. The runner adjustment assembly moves the runner connection axis along an adjustment axis as the runner adjustment assembly translates the ski runner between the first and second positions. The adjustment axis is angled relative to the translation axis when a snowmobile provided with the snowmobile ski assembly is disposed on flat, level ground.

In some implementations of the present technology, the ski runner translates along a translation axis between the first and second positions. The translation axis is vertical when a snowmobile provided with the snowmobile ski assembly is disposed on flat, level ground.

In some implementations of the present technology, the ski runner defines an arcuate slot. The runner adjustment assembly has a connector extending through the slot. The connector is movable inside the slot as the ski pivots about the ski pivot axis.

In some implementations of the present technology, a ski leg is pivotally connected to the ski about a laterally extending ski pivot axis. The ski is pivotable about the ski pivot axis relative to the ski leg. The runner adjustment assembly is connected to the ski leg.

In some implementations of the present technology, the ski has a front wall at a front of the slot and a rear wall at a rear of the slot. The ski runner has a front wall abutting the front wall of the ski and a rear wall abutting the rear wall of the ski. The ski runner translates along a translation axis between the first and second positions. The front and rear walls of the ski, and the front and rear walls of the ski runner are parallel to the translation axis.

In some implementations of the present technology, the runner adjustment assembly has: an adjustment mechanism connected to the ski runner at a first connection, and a housing connected to the ski leg at a second connection, the housing being connected to the adjustment mechanism at a third connection, and the housing receiving the adjustment mechanism at least in part therein. The second connection is disposed vertically above the first connection and vertically below the third connection.

In some implementations of the present technology, the runner adjustment assembly has: a housing, a first part disposed at least in part in the housing, the first part being rotatable relative to the housing about a rotation axis, the first part being fixed along the rotation axis; and a second part disposed at least in part in the housing, the second part engaging the first part, the second part being rotationally fixed relative to the housing, the second part being movable along the rotation axis, the second part being connected to the ski runner. One of the first and second parts has an external thread. An other one of the first and second parts has an internal thread engaging the external thread of the one of the first and second parts. Rotation of the first part about the rotation axis causes the second part to move along the rotation axis, thereby causing the ski runner to translate between the first and second positions.

In some implementations of the present technology, the runner adjustment assembly has: a pair of arms connected to the second part, the ski runner being received between the arms, and a pin passing through the arms and the ski runner.

In some implementations of the present technology, the runner adjustment assembly has a knob connected to the first part for turning the first part about the rotation axis.

In some implementations of the present technology, the runner adjustment assembly has a position indicator disposed externally of the housing, the position indicator being connected to the second part. The position indicator is movable with the second part.

In some implementations of the present technology, the runner adjustment assembly is connected to the ski runner at a single location.

In some implementations of the present technology, translation of the ski runner occurs as a result of an actuation of a single component of the runner adjustment assembly.

In some implementations of the present technology, the single component is a knob and translation of the ski runner occurs as a result of a turning of the knob.

In some implementations of the present technology, the slot extends through the ski.

In some implementations of the present technology, the runner adjustment assembly has a pin connecting the runner adjustment assembly to the ski runner. The pin is disposed in the slot defined by the ski.

In some implementations of the present technology, a ski leg pivotally is connected to the ski about a laterally extending ski pivot axis. The ski is pivotable about the ski pivot axis relative to the ski leg. The runner adjustment assembly extends at least partially through the ski leg.

According to another aspect of the present technology, there is provided a snowmobile having a frame having a tunnel, a motor supported by the frame, a drive track operatively connected to the motor and being disposed at least in part under the tunnel, a handlebar supported by the frame, and a pair of snowmobile ski assemblies of any one of the above implementations operatively connected to the handlebar.

According to yet another aspect of the present technology, there is provided a snowmobile ski assembly having a ski leg, a ski pivotally connected to the ski leg about a laterally extending pivot axis, a runner adjustment assembly connected to the ski leg, and a ski runner connected to the runner adjustment assembly. The runner adjustment assembly selectively translates the ski runner between first and second positions relative to the ski. A bottom of the ski runner is closer to a bottom of the ski in the first position than in the second position.

In some implementations of the present technology, the ski runner is connected to the ski leg via the runner adjustment assembly such that, when a snowmobile provided with the snowmobile ski assembly is disposed on flat, level ground with the bottom of the ski being spaced from the ground, a weight of the snowmobile results in a force passing through the ski leg, the runner adjustment assembly and the ski runner to the ground without passing through the ski.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 5 is a right side elevation view of a ski runner of the ski assembly of FIG. 2;

FIG. 6 is a front elevation view of the ski runner of FIG. 5;

FIG. 22 is a top plan view of another alternative implementation of a ski leg, a runner adjustment assembly and a ski runner of the snowmobile of FIG. 1;

FIG. 23 is a cross-sectional view of the ski leg, the runner adjustment assembly and the ski runner of FIG. 22 taken along line 23-23 of FIG. 22.

DETAILED DESCRIPTION

Figure 1:
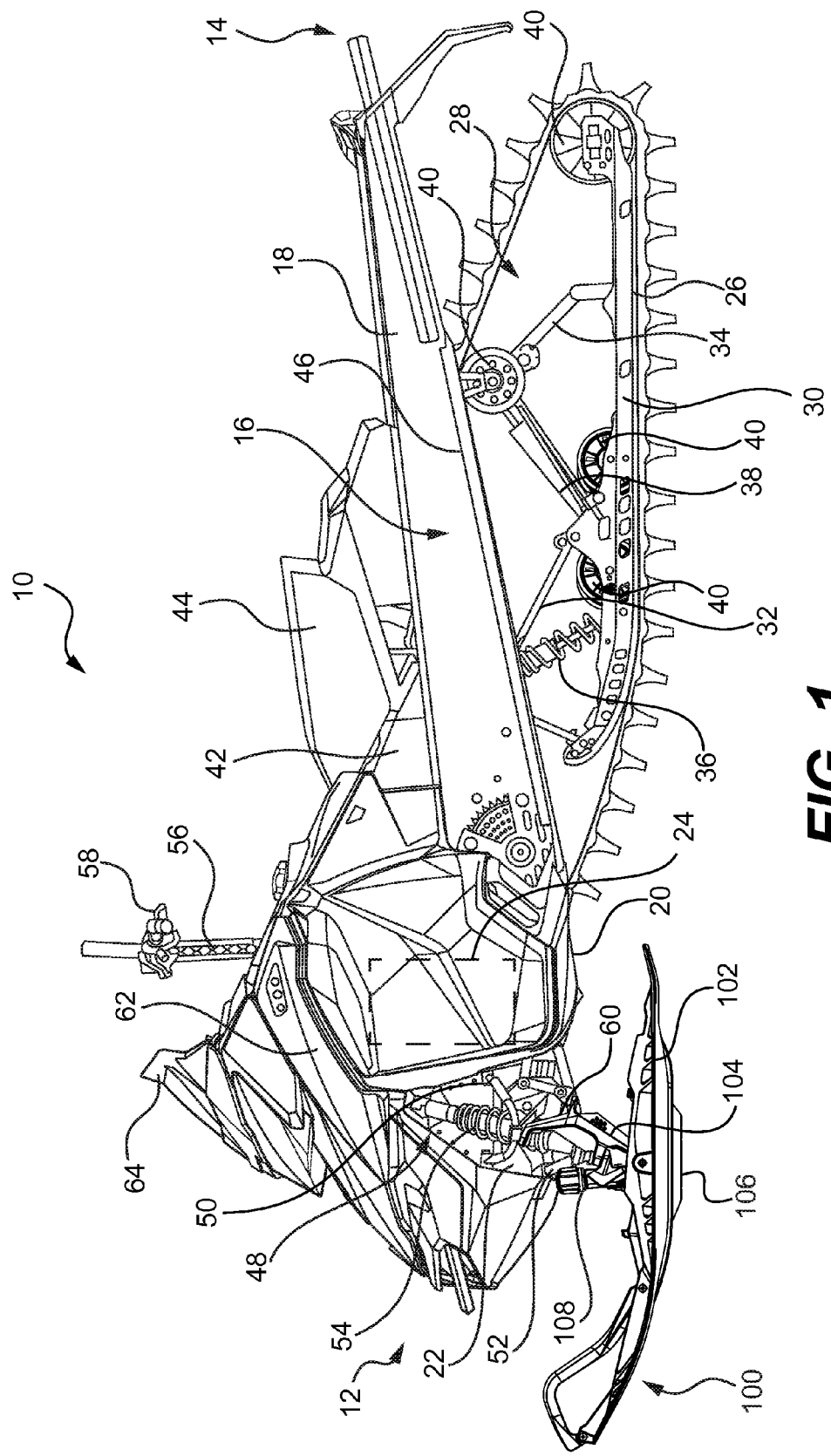
FIG. 1 is a left side elevation view of a snowmobile.

With reference to FIG. 1, a snowmobile 10 will be described. Although a snowmobile 10 is presented herein, it is contemplated that aspects of the present technology could be applied to other types of vehicles having skis for operation on snow.

The snowmobile 10 has a front end 12 and a rear end 14, which are defined consistently with the forward travel direction of the snowmobile 10. The snowmobile 10 includes a frame 16. The frame 16 includes a tunnel 18, a motor cradle portion 20 and a front suspension assembly portion 22. A motor 24, which is schematically illustrated in FIG. 1, is supported by the motor cradle portion 20. In the present implementation, the motor 24 is a four-stroke, two-cylinder, internal combustion engine. However, it is contemplated that other types of motors could be used such as, but not limited to, an electric motor or a two-stroke internal combustion engine.

An endless drive track 26 is disposed under the tunnel 18. The endless drive track 26 is operatively connected to the engine 24 through a continuously variable transmission (CVT, not shown). The endless drive track 26 is suspended for movement relative to the frame 16, by a rear suspension assembly 28. The rear suspension assembly 28 includes a pair of spaced apart slide rails 30, rear suspension arms 32, 34 and shock absorbers 36, 38. The slide rails 30 engage the inner side of the endless drive track 26. The rear suspension arms 32, 34 and the shock absorbers 36, 38 pivotally connect the tunnel 18 to the slide rails 30. The endless drive track 26 is driven to run about the rear suspension assembly 28 for propulsion of the snowmobile 10. A plurality of rollers 40 define the path over which the endless drive track 26 travels.

A fuel tank 42 is supported on top of the tunnel 18. A seat 44 is disposed on the fuel tank 42 and is adapted to support a rider. Two footrests 46 (only one of which is shown) are positioned on opposite sides of the tunnel 18 below the seat 44 to support the rider's feet. The footrests 46 are integrally formed with the tunnel 18.

Left and right ski assemblies 100 are positioned at a front of the snowmobile 10 (only the left one being shown in FIG. 1). Each ski assembly 100 includes a ski 102, a corresponding ski leg 104 and other components that will be described in greater detail below. Each ski assembly 100 is attached to the front suspension assembly portion 22 of the frame 16 via a front suspension assembly 48. Each front suspension assembly 48 includes an upper A-arm 50, a lower A-arm 52 and a shock absorber 54. Each ski leg 104 is pivotally connected to its corresponding upper and lower A-arms 50, 52 and the corresponding shock absorber 54 is connected between the lower A-arm 52 and the front suspension assembly portion 22 of the frame 16. It is contemplated that other types of front suspension assemblies could be used. It is contemplated that the snowmobile 10 could have only one ski assembly 100.

A steering assembly including a steering column 56 and handlebar 58 is supported by the frame 16. The steering column 56 is attached at its upper end to the handlebar 58, which is positioned forward of the seat 44. The steering column 56 is operatively connected to the ski legs 104 by steering rods 60 in order to steer the skis 102, and thereby the snowmobile 10, when the handlebar 58 is turned.

Fairings 62 enclose the engine 24 and the CVT, thereby providing an external shell that protects the engine 24 and CVT. The fairings 62 include a hood and one or more side panels that can be opened to allow access to the engine 24 and the CVT when this is required, for inspection or maintenance of the engine 24 and/or the CVT for example. A windshield 64 is connected to the fairings 62 forward of the handlebar 58. It is contemplated that the windshield 64 could be attached directly to the handlebar 58.

Turning now to FIGS. 2 to 16, the left ski assembly 100 of the snowmobile 10 will be described. The left ski assembly 100 includes the left ski 102, the left ski leg 104, a left ski runner 106 and a left runner adjustment assembly 108. In the right ski assembly 100, the right ski 102, the right ski runner 106 and the right runner adjustment assembly 108 are identical to those of the left ski assembly 100 and the right ski leg 104 is a mirror image of the left ski leg 104. Accordingly, for simplicity, only the left ski assembly will be described in detail herein. It is contemplated that both ski legs 104 could be identical, or that the ski legs 104 could have features that differ from each other. It is contemplated that one or more of the right ski 102, the right ski runner 106 and the right runner adjustment assembly 108 could be a mirror image of those of the left ski assembly 100 or could have one or more features that differ from those of the left ski assembly 100. It is contemplated that in some implementation of the ski assembly 100, such as in a replacement ski assembly for replacing an existing ski of a snowmobile 10, the ski leg 104 could be omitted as a suitable ski leg 104 may already be provided on the snowmobile 10.

Figure 2:
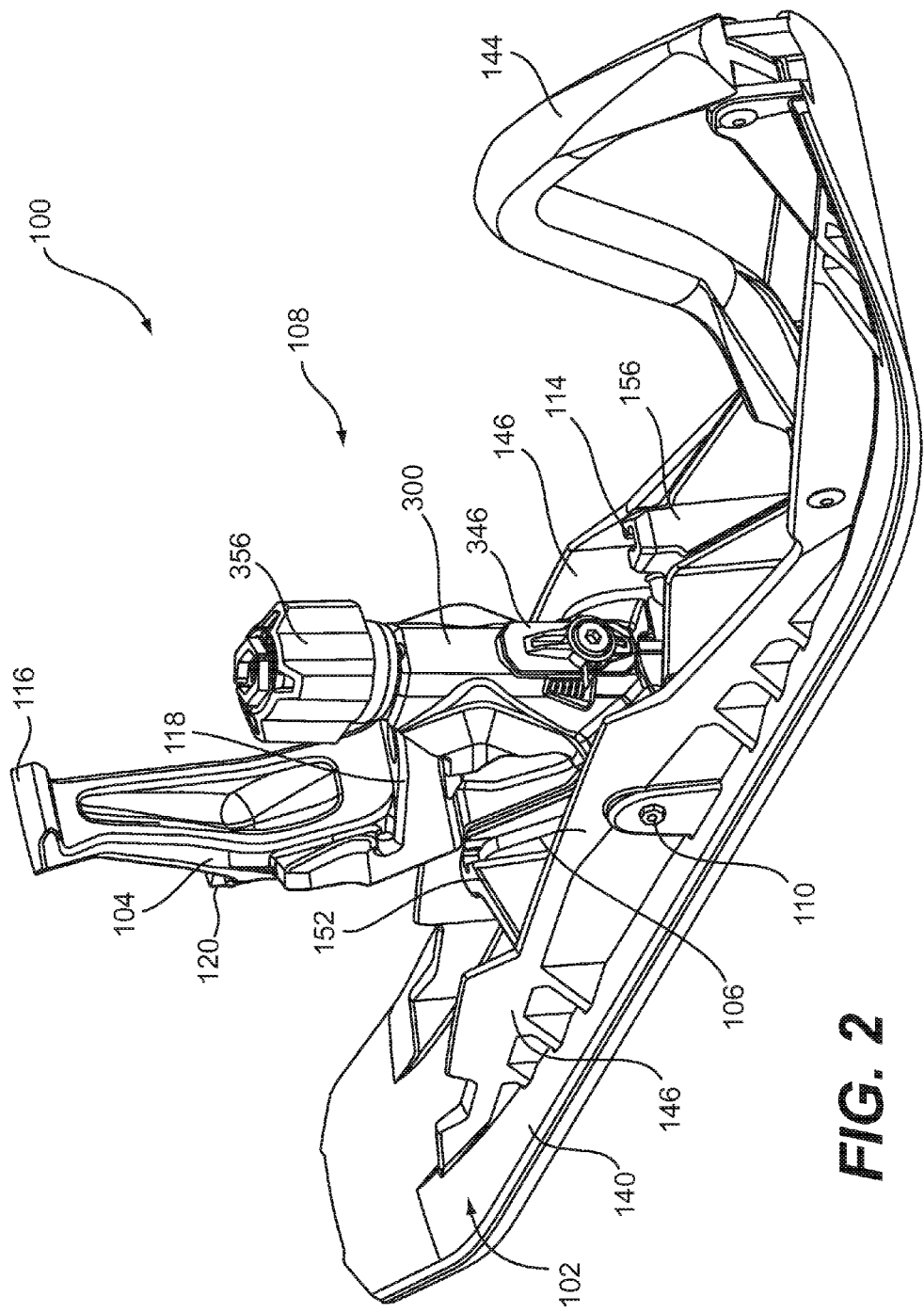
FIG. 2 is a perspective view taken from a front, right side of a left ski assembly of the snowmobile of FIG. 1.
Figure 9:
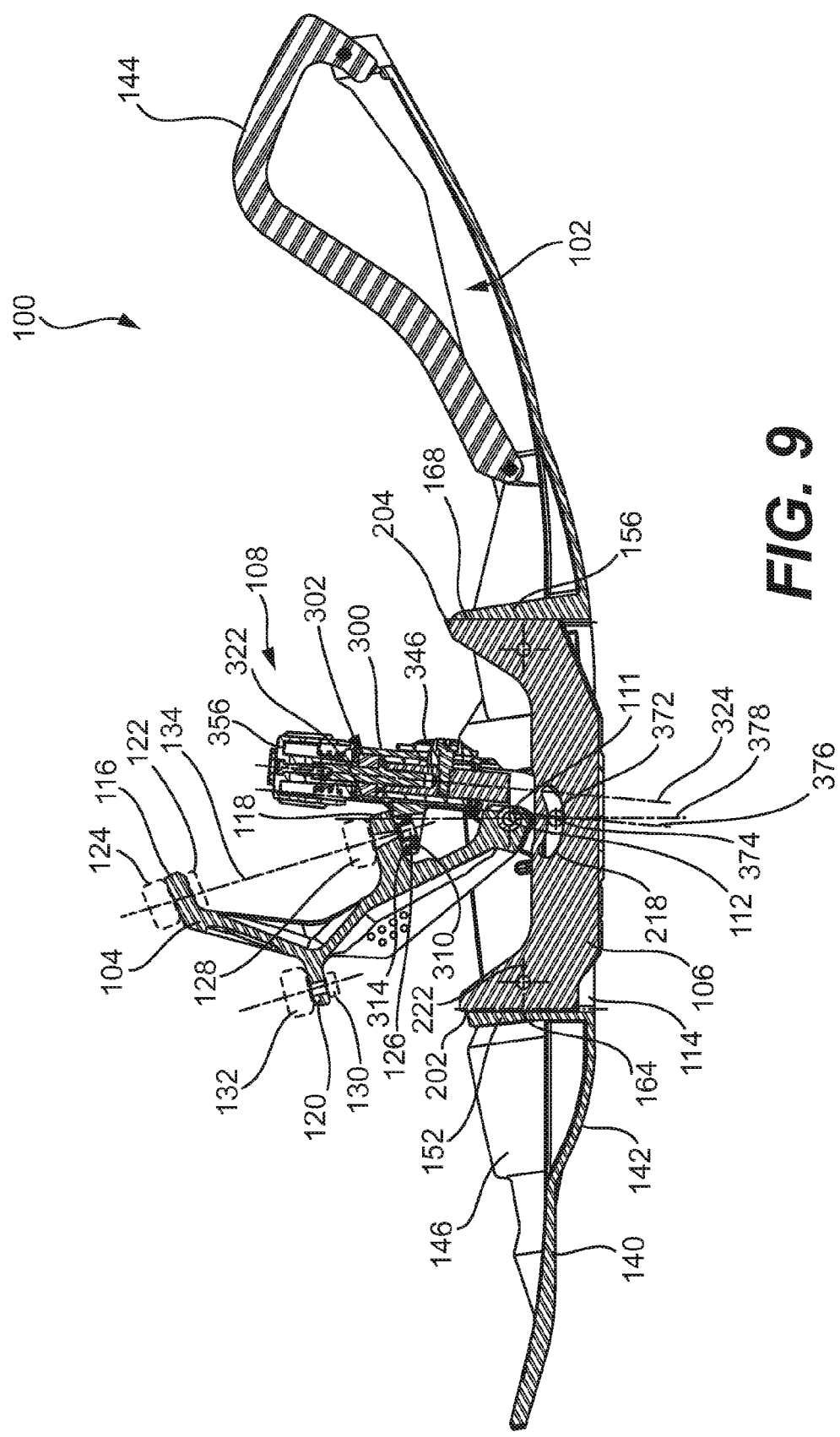
FIG. 9 is a cross-sectional view of the ski assembly of FIG. 2 taken through a longitudinal centerline of the ski assembly with the ski runner in the raised position of FIG. 8.

As can be seen in FIGS. 2, 6 and 9, the ski 102 is pivotally connected to a bottom of the ski leg 104 by a bolt 110, or another fastener such as a rivet for example. The bolt 110 defines a laterally extending ski pivot axis 112 about which the ski 102 pivots relative to the ski leg 104. The runner adjustment assembly 108 is connected to the bolt 110 about the ski pivot axis 112 and to the ski leg 104. As such, the ski 102 pivots about the ski pivot axis 112 relative to the runner adjustment assembly 108. As can be seen, the runner adjustment assembly 108 is disposed in front of the ski leg 104 and is therefore disposed closer to a front of the ski 102 than the ski leg 104. The ski runner 106 is inserted in a slot 114 defined in the ski 102. The slot 114 stabilizes the ski runner 106 laterally and prevents rotation of the ski runner 106 relative to the ski 102. The runner adjustment assembly 108 is connected to the ski runner 106. The runner adjustment assembly 108 is used to translate the ski runner 106 inside the slot 114 to change an amount by which the ski runner 106 extends below the ski 102, as will be described in greater detail below. By changing the amount by which the ski runner 106 extends below the ski 102, the ski assembly 100 can be adjusted for different riding conditions.

Figure 8:
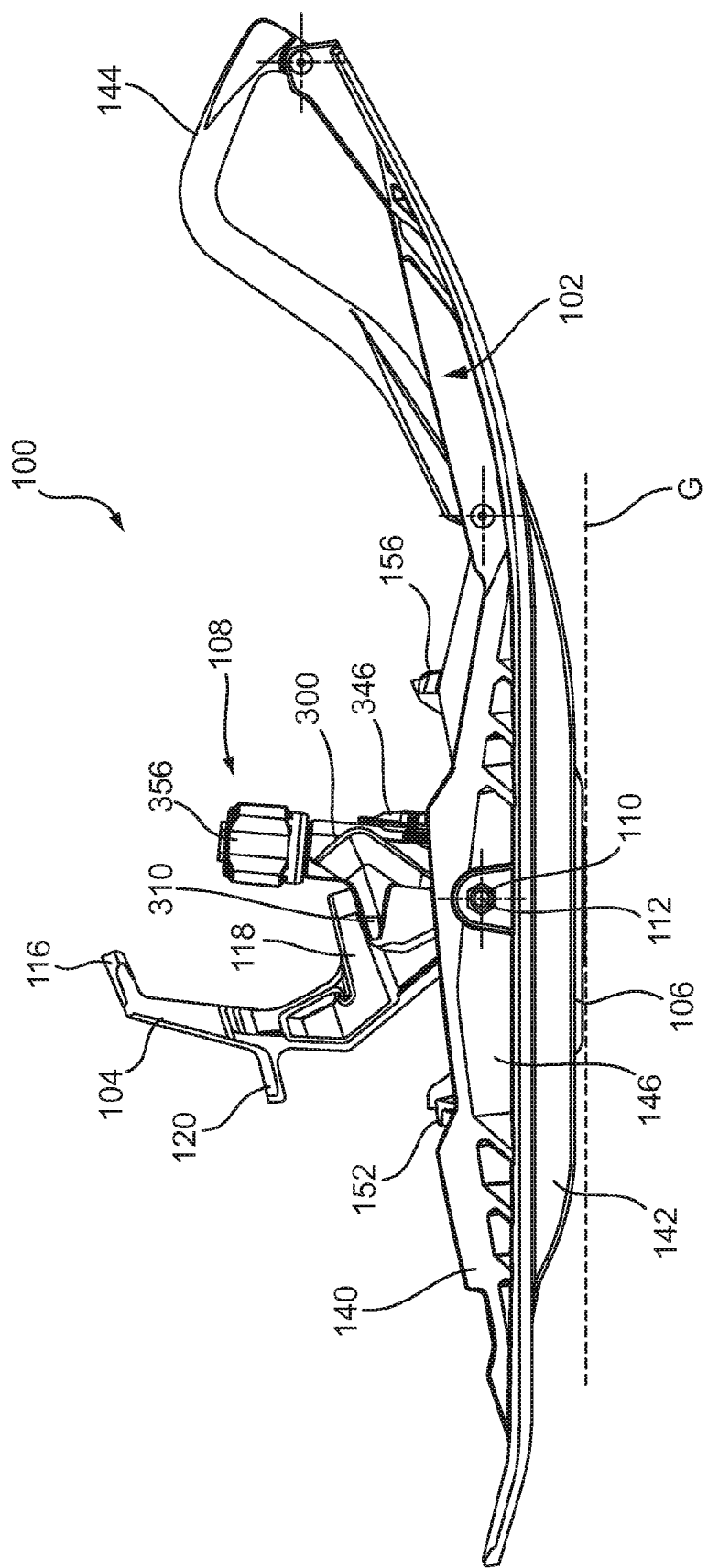
FIG. 8 is a right side elevation view of the ski assembly of FIG. 2 with the ski runner in a raised position.

As can be seen, the only vertical load-bearing connection between the ski runner 106 and the ski leg 104 is provided via the runner adjustment assembly 108 as the ski runner 106 is not connected directly to the ski 102. As such, the ski 102 only bears a vertical load when its bottom surface is in contact with a surface on which the snowmobile 10 rides. Vertical forces applied upward to the ski runner 106 are transferred to the runner adjustment assembly 108 and not to the ski 102. As can be seen in FIG. 8, when the snowmobile 10 is disposed on flat, level ground G, such as when riding on an icy level surface, the ski assembly 100 is supported on the ground G by the ski runner 106 and the bottom of the ski 102 is spaced from the ground G. Under these conditions, the weight of the snowmobile 10 results in a force passing through the ski leg 104, the runner adjustment assembly 108 and the ski runner 106 to the ground G without passing through the ski 102.

With reference to FIG. 9, the ski leg 104 has an upper front tab 116, a lower front tab 118, and a rear tab 120. A ball joint stud (not shown) is inserted through and connected to the upper front tab 116 by a nut 122 (shown in dotted lines) to connect the ski leg 104 to a ball joint 124 (shown in dotted lines) connected to the end of the upper A-arm 50. A ball joint stud (not shown) is inserted through and connected to the lower front tab 118 by a nut 126 (shown in dotted lines) to connect the ski leg 104 to a ball joint 128 (shown in dotted lines) connected to the end of the lower A-arm 52. A ball joint stud (not shown) is inserted through and connected to the rear tab 120 by a nut 130 (shown in dotted lines) to connect the ski leg 104 to a ball joint 132 (shown in dotted lines) connected to the end of the steering rod 60. When the driver of the snowmobile 10 turns the handlebar 58, the steering rod 60 pushes or pulls, as the case may be, on the rear tab 120. As a result, the ski leg 104 pivots about a ski leg pivot axis 134 passing through the centers of the ball joints 124, 128.

Figure 3:
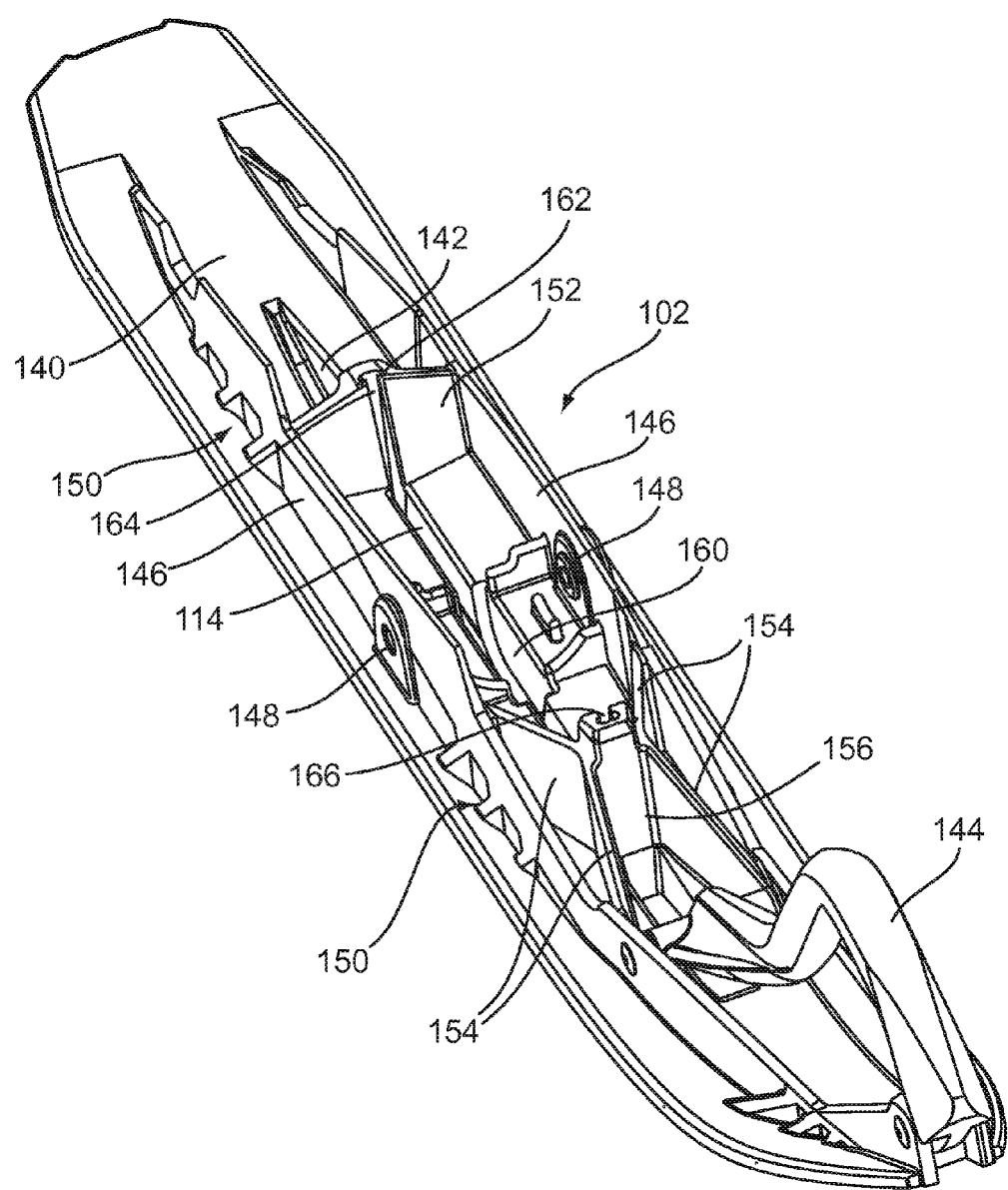
FIG. 3 is a perspective view taken from a front, right side of a ski of the ski assembly of FIG. 2.
Figure 4:
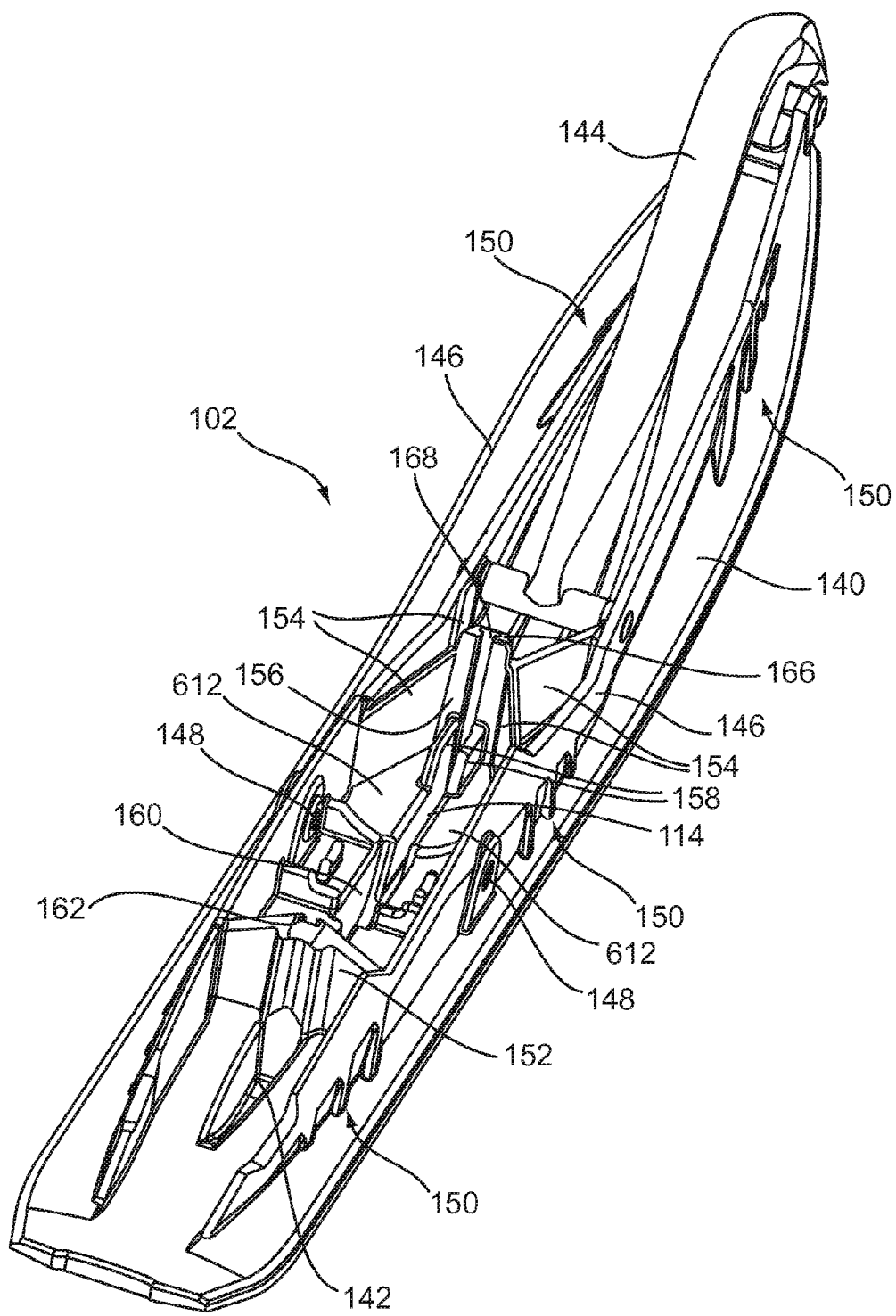
FIG. 4 is a perspective view taken from a rear, right side of the ski of FIG. 3.

With reference to FIGS. 3, 4 and 8, the ski 102 includes a ski body 140, a keel 142 (FIG. 8) disposed on the bottom of the ski body 140, and a handle 144 connected to the upturned front portion of the ski body 140. The ski body 140 and the keel 142 are made of ultra-high molecular weight (UHMW) polyethylene. It is contemplated that the ski body 140 and the keel 142 could be made of other suitable materials.

As mentioned above, the front portion of the ski body 140 curves upwards. The middle and rear portions of the ski body 140, as seen from a side of the ski body 140, are generally flat except for a portion adjacent to the rear end that is angled upwards. As seen from above, the front and rear of the ski body 140 are tapered and the sides of the middle portion are parallel. It is contemplated that the ski body 140 could have a general shape other than as shown in the illustrated implementation. For example, the ski body 140 could have a sidecut or a flat rear end.

The ski body 140 has left and right longitudinally extending walls 146 extending upwards from an upper surface of the ski body 140. The walls 146 are laterally inwards of the lateral sides of the ski body 140. It is contemplated that the walls 146 could be disposed along the lateral sides of the ski body 140, and that they could extend more or less in the longitudinal direction than as shown in the illustrated implementation. The handle 144 is connected between the walls 146. Apertures 148 are defined in the walls 146 to receive the bolt 110 used to fasten the ski 102 to the ski leg 104. As can be seen, the portions of the walls 146 surrounding the apertures 148 are thicker than other portions of the walls 146 in order to reinforce these portions of the walls 146. Ribs 150, extending laterally outwards from the walls 146, provide structural reinforcement to the walls 146. It is contemplated that ribs extending laterally inwards from the walls 146 could be provided. It is also contemplated that the ribs 150 could be omitted.

The ski body 140 has a wall 152 extending laterally between the walls 146. The ski body 140 also has four walls 154 extending angularly inward from the walls 146 to a laterally extending wall 156. Two walls 158 (FIG. 4) extend longitudinally rearward from the wall 156. The two walls 158 are shorter than the wall 156. The function of the walls 158 will be described below.

The longitudinal slot 114 is defined by and extends through the ski body 140 and the keel 142. The slot 114 extends longitudinally between the walls 146 and is disposed along the longitudinal centerline of the ski 102. It is contemplated that the slot 114 could not be laterally centered in the ski 102. It is also contemplated that the slot 114 could be defined in the keel 142 and the ski body 140 but only open at a bottom of the keel 142 and not extend through the keel 142 and the ski body 140, such as in the ski assembly 700 described in greater detail below. In such an implementation, an aperture is provided to allow the runner adjustment assembly 108 to be connected to the ski runner 106. The longitudinal central portion 160 of the slot 114 is wider than the portions of the slot 114 adjacent to it in order to accommodate a connection between the ski runner 106 and the runner adjustment assembly 108. The rear end 162 of the slot 114 is defined in the wall 152 thereby defining a rear wall 164. The front end 166 of the slot 114 is defined in the wall 156 thereby defining a front wall 168. As can be seen in FIG. 9, the rear and front walls 164, 168 are parallel to each other. In the present implementation, the walls 164, 168 are flat. It is contemplated that the walls 164, 168 could not be flat, but still could provide parallel surfaces along which the ski runner 106 can translate. For example, the walls 164, 168 could define a series of bumps having the same dimensions.

Figure 7:
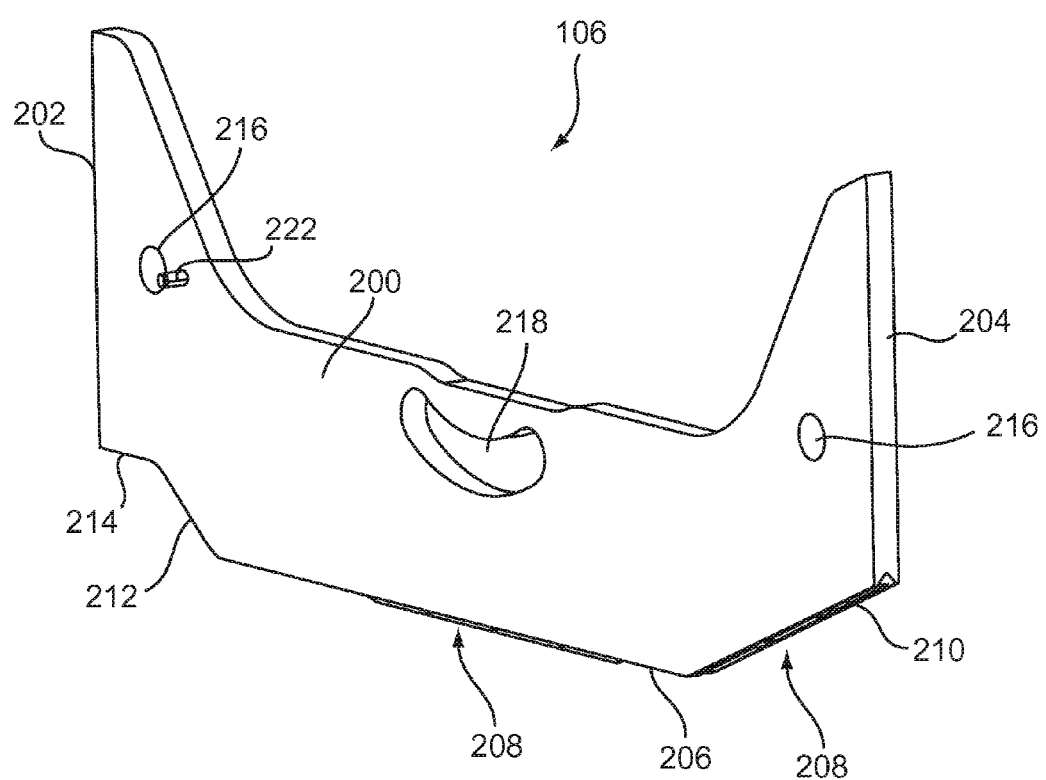
FIG. 7 is a perspective view taken from a front, right side of the ski runner of FIG. 5.

Turning now to FIGS. 5 to 7, the ski runner 106 will be described in more detail. The ski runner 106 has a ski runner body 200 cut, by stamping for example, from a metal plate. As a result, the ski runner body 200 is flat and has a uniform width W (FIG. 6). It should be understood that the surface of the ski runner body 200 could be engraved or embossed, to write the manufacturer's name for example, in which case the surface would nonetheless be considered as having a generally uniform width W. It is contemplated that the ski runner body 200 could be made from other materials and by other manufacturing techniques. For example, the ski runner body 200 could be machined, laser cut or cast or by a combination of such techniques.

The ski runner body 200 has a rear flat wall 202 and a front flat wall 204. The walls 202, 204 are parallel to each other. As can be seen in FIG. 9, when the ski runner 106 is inserted in the slot 114, the walls 202, 204 are parallel to the walls 164, 168 of the ski 102 and abut the walls 164, 168 respectively. When the ski runner 106 is translated in the slot 114, the wall 202 of the ski runner body 200 translates along the wall 164 and the wall 204 of the ski runner body 200 translates along the wall 168.

The ski runner body 200 has a lower edge referred to herein as the ground engaging edge 206. The ground engaging edge 206 is straight and perpendicular to the walls 202, 204. It is contemplated that the ground engaging edge could not be straight. For example, the ground engaging edge 206 could be convex. It is also contemplated that the ground engaging edge 206 could not be perpendicular to the walls 202, 204. The ground engaging edge 206 forms a channel inside which are received wearbars 208. The wearbars 208 are brazed to the ski runner body 200. The wearbars 208, as their name suggest, are intended to make contact with the ground and wear instead of the ski runner body 200. The wearbars 208 are sometimes referred to as carbides in reference to the material from which they are usually made. It is contemplated that the wearbars 208 could be connected to the ski runner body 200 by other means. It is also contemplated that the wearbars 208 could be omitted. As would be understood, when the ski assembly 100 operates on a hard surface such as asphalt when the snowmobile 10 has to cross a paved road, because of the wearbars 208, the ground engaging edge 206 does not actually engage the ground, but it is nonetheless referred to as a ground engaging edge for purposes of the present application.

A front angled edge 210 connects the front end of the ground engaging edge 206 to the bottom of the front wall 204. The front angled edge 210 also forms a channel inside which wearbars 208 are brazed. A rear angled edge 212 connects the rear end of the ground engaging edge 206 to the front end of a horizontal edge 214, and the rear end of the horizontal edge 214 is connected to the bottom of the rear wall 202. As best seen in FIG. 5, the top side of the ski runner body 200 is recessed, which makes the ski runner body 200 generally U-shaped.

The ski runner body 200 has two apertures 216 defined therein. These are used to hold the ski runner body 200 in place during the manufacturing process. It is contemplated that the apertures 216 could be omitted.

The ski runner body 200 defines an arcuate slot 218 in a central portion thereof. The arcuate slot 218 is closer to the rear wall 202 than to the front wall 204. The arcuate slot 218 has a center of curvature 220. A radius of curvature R of the arcuate slot 218 corresponds to a distance between the pivot axis 112 of the ski 102 and the center of the arcuate slot 218 at one of the positions of the ski runner 106 in the slot 114. The arc length of the arcuate slot 218 is selected based on a desired amount of rotation of the ski 102 about the pivot axis 112. In the present implementation, the arc length of the arcuate slot 218 is selected to provide 20 degrees of rotation of the ski 102 about the pivot axis 112 in one direction and 40 degrees in the other direction. It is contemplated that the arc length of the arcuate slot 218 could be longer or shorter.

As best seen in FIG. 5, the height H1 of the rear wall 202 and the height H2 of the front wall 204 are greater than a height H3 of the ski runner body 200 measured between the ground engaging edge 206 and the top side of the ski runner body 200 at all locations aligned with the arcuate slot 218 (i.e. between the lines A and B). As can also be seen in FIG. 5, the vertical distance between the top of the rear wall 202 and the ground engaging edge 206 and the vertical distance between the top of the front wall 204 and the ground engaging edge 206 are greater than the vertical distance between the highest point of the arcuate slot 218 and the ground engaging edge 206. The vertical distance between the bottom of the rear wall 202 and the ground engaging edge 206 is smaller than the vertical distance between the lowest point of the arcuate slot 218 and the ground engaging edge 206.

The ski runner 106 has a pin 222 inserted in the ski runner body 200 in front of and near to the rear aperture 216. As can be seen in FIG. 6, the pin 222 extends from both lateral sides of the ski runner body 200. It is contemplated that the pin 222 could only extend from one side of the ski runner body 200. Since the front and rear portions of the ski runner body 200 is not symmetric to each other, the pin 222 is provided in order to prevent the ski runner 106 from being inserted backwards in the slot 114 of the ski 102. Should the ski runner 106 be inserted backwards in the slot 114 (i.e. with the rear wall 202 at the front and the front wall 204 at the rear), when the ski runner 106 is lowered in the slot 114, the pin 222 makes contact with the walls 158 (FIG. 4) of the ski body 140 discussed above, thereby preventing the ski runner 106 from being sufficiently lowered in the slot 114 for proper installation. It is contemplated that the pin 222 could be provided on a front portion of the ski runner body 200, in which case the walls 158, or similar features, would have to be moved on the ski body 140 so as to abut the pin 222 should the ski runner 106 be inserted backwards in the slot 114.

Figure 14:
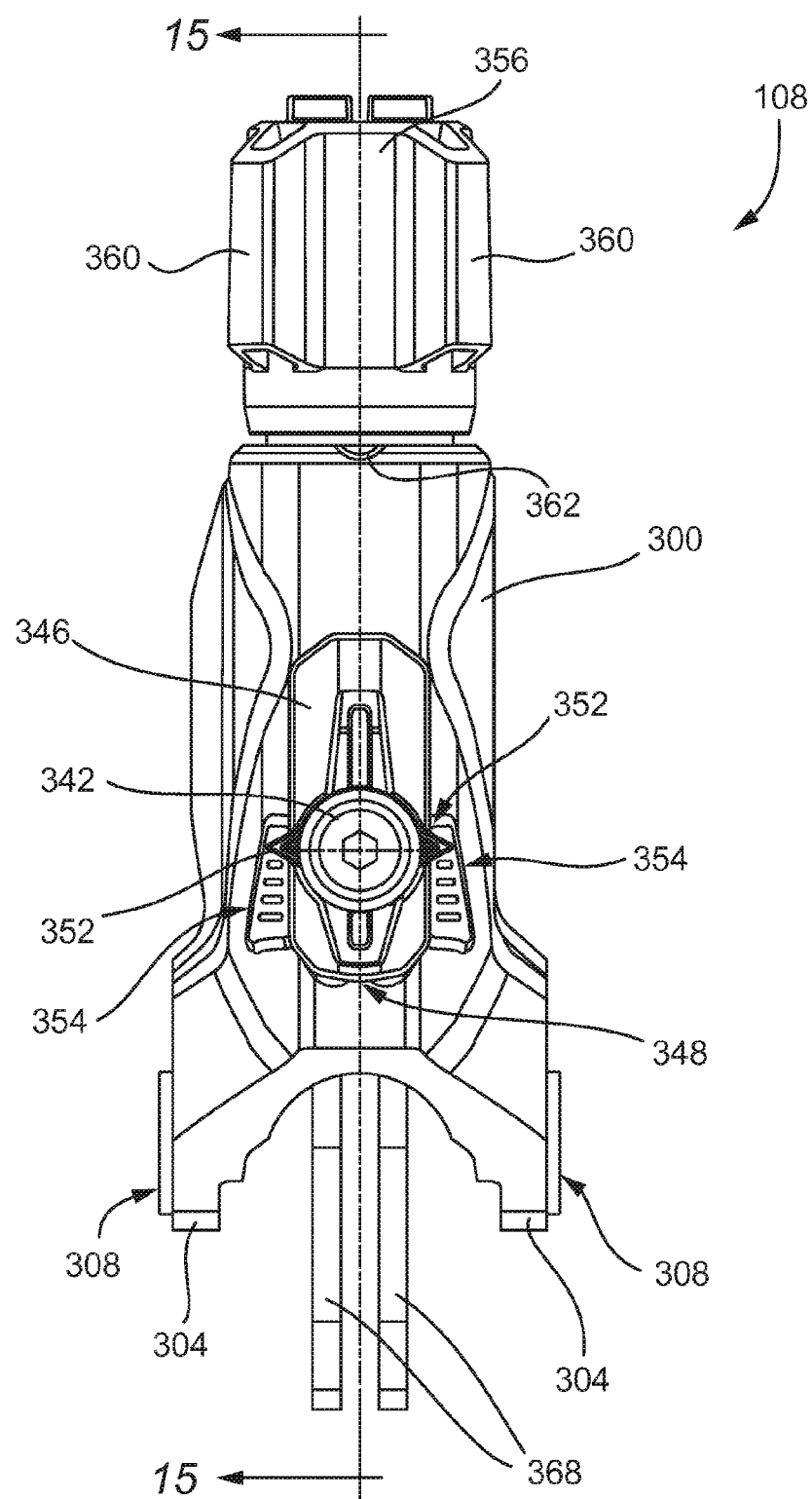
FIG. 14 is a front elevation view of a runner adjustment assembly of the ski assembly of FIG. 2.
Figure 15:
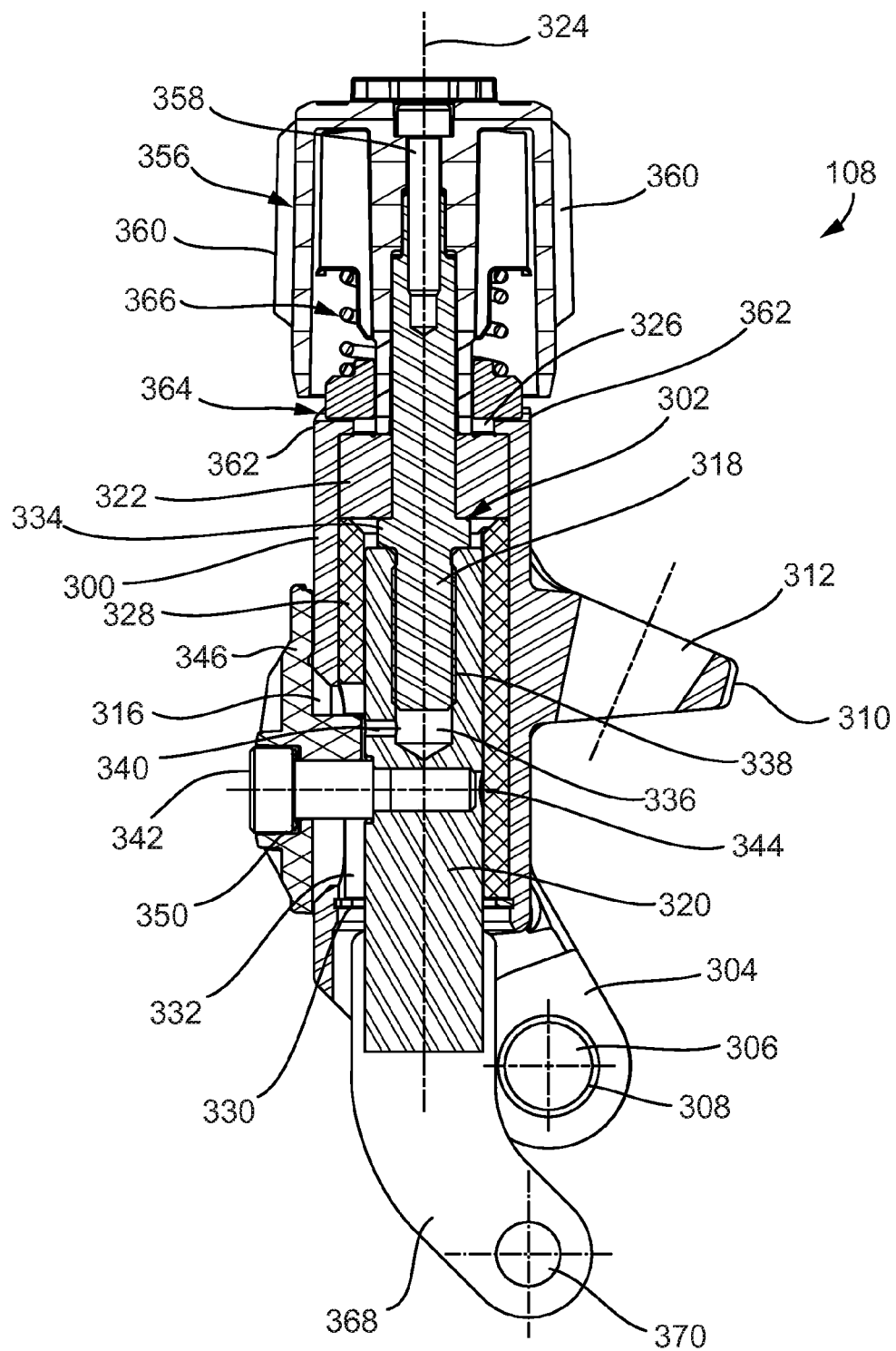
FIG. 15 is a cross-sectional view of the runner adjustment assembly of FIG. 14 taken through line 15-15 of FIG. 14.
Figure 16:
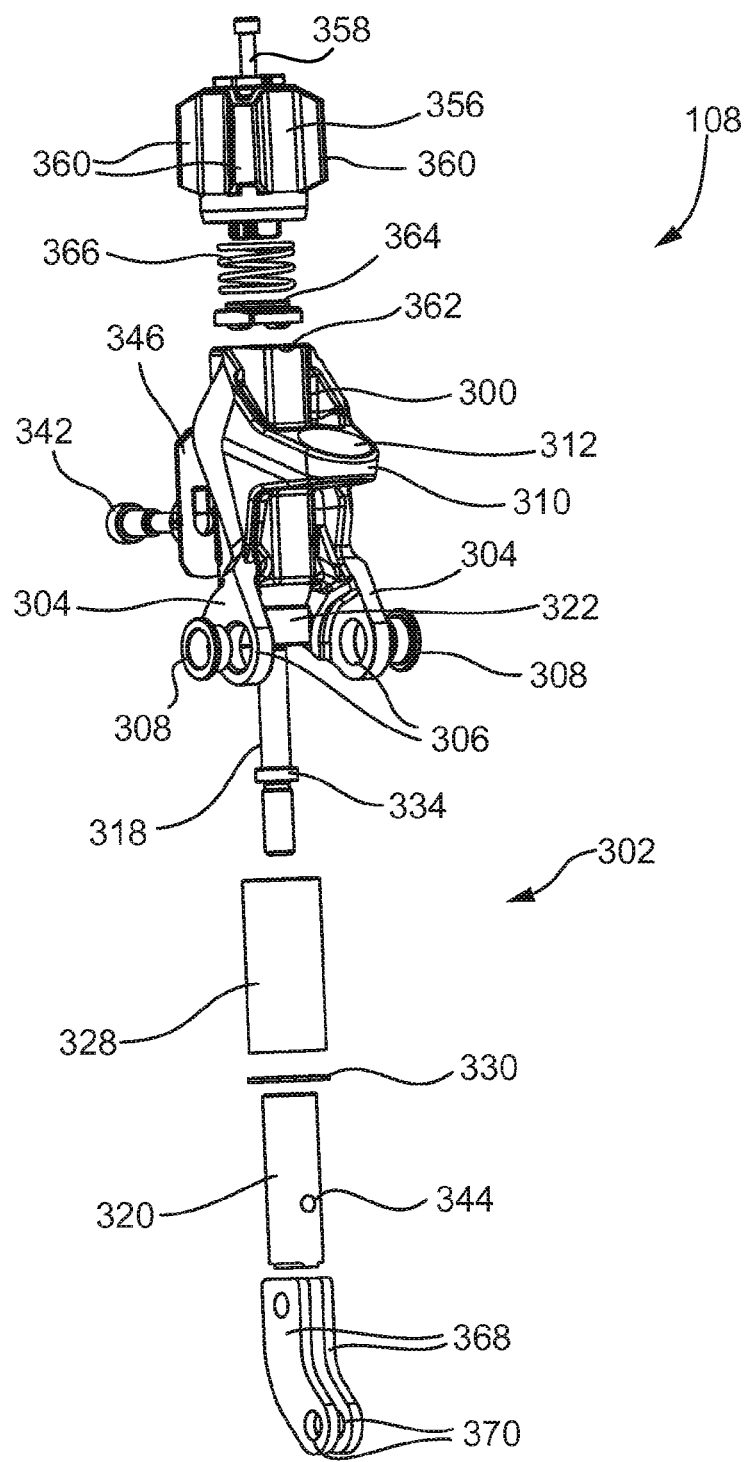
FIG. 16 is an exploded view of the runner adjustment assembly of FIG. 14.

Turning now to FIGS. 14 to 16, the runner adjustment assembly 108 will be described in more detail. The runner adjustment assembly 108 includes a housing 300 inside which an adjustment mechanism 302 is housed in part. As will be explained in greater detail below, actuation of the adjustment mechanism 302 causes the ski runner 106 to be moved up or down inside the slot 114.

The housing 300 has a pair of spaced apart tabs 304. The tabs 304 define apertures 306 inside which bushings 308 are inserted. It is contemplated that the bushings 308 could be omitted. The bolt 110 is fastened to an axle 111 received in the bushings 308 to connect the housing 300 to the ski leg 104. The ski leg 104 is received between the tabs 304. The housing 300 also has a tab 310 defining a frustoconical aperture 312. As can be seen in FIG. 9, a rubber grommet 314 is disposed in the aperture 312 of the tab 310. The nut 126 used to connect the ski leg 104 to the ball joint 128 connected to the end of the lower A-arm 52 is received in the grommet 314. As a result, the runner adjustment assembly 108 is prevented from pivoting about the pivot axis 112 relative to the ski leg 104. The housing 300 also defines a slot 316 (FIG. 15) in a front thereof, the function of which will be described below.

The adjustment mechanism 302 has two main parts: a shaft 318 having external threads and a shaft 320 having internal threads. The threaded portion of the shaft 318 is received in the threaded portion of the shaft 320. As the shaft 318 rotates, the shaft 320 slides in and out of the housing 300. It is contemplated that the shaft 318 could have the internal thread and that the shaft 320 could have the external thread. Other types of adjustment mechanisms are contemplated. For example, the shafts 318, 320 could be replaced by a rack and pinion assembly.

The lower portion of the shaft 318 is received in the housing 300 and the top portion of the shaft 318 protrudes from the top of the housing 300. The shaft 318 is received in a ball bearing 322 that is press-fit in a top of the housing 300. As such, the shaft 318 can rotate about a rotation axis 324. However, the shaft 318 does not slide along the rotation axis 324. The top of the ball bearing 322 abuts an inner flange 326 defined by the housing 300. The bottom of the ball bearing 322 abuts the top of a sleeve 328 inserted in the housing 300. The bottom of the sleeve 328 abuts a C-clip 330 clipped in the housing 300. As such, the C-clip 330 and the flange 326 prevent the ball bearing 322 and the sleeve 328 from sliding along the rotation axis 324. The sleeve 328 also defines a slot 332 in alignment with the slot 316 of the housing 300. The shaft 318 has a shoulder 334 that abuts the bottom of the ball bearing 322. The portion of the shaft 318 below the shoulder 334 has an external thread thereon.

The shaft 320 is received in the sleeve 328 inside the housing 300 and protrudes from a bottom of the housing 300. The shaft 320 has a bore 336 defined in a top thereof. The bore 336 has an internal thread. The lower threaded portion of the shaft 318 is received in and engages the thread in the bore 336. Grease could be provided in the interface 338 between the shafts 318, 320. An aperture 340 extends from an outer surface of the shaft 320 in order to permit water entering the bore 336 to be drained therefrom. The aperture 340 opens in a front of the shaft 320 such that water draining from the bore 336 then drains out of the sleeve 328 and housing 300 via the slot 332.

A screw 342 is inserted through the slots 316, 332 and into a counterbored aperture 344 in the shaft 320. As can be seen in FIG. 15, the aperture 344 is perpendicular to the rotation axis 324 and is disposed below the aperture 336. As explained above, turning the shaft 318 causes the shaft 320 to move along the rotation axis 324. The screw 342 abuts the sides of the slot 316 thereby preventing the shaft 320 to rotate about the axis rotation with the shaft 318. The screw 342 also prevents the shaft 320 from moving too far down along the rotation axis 324 by coming into contact with the bottom portion of the slot 316, thereby stopping the shaft 320 before the threads of the shafts 318, 320 disengage from each other. The upward movement of the shaft 320 is stopped when the top end of the shaft 320 comes into contact with the shoulder 334 of the shaft 318 as shown if FIG. 15.

The screw 342 is also inserted through a cover 346 disposed outside the housing 300 so as to cover the slot 316 in the housing to reduce the entry of snow and water into the housing 300 via the slot 316. A clearance 348 (FIG. 14) is provided in the bottom center of the cover 346 to permit water drainage from the interior of the housing 300 through the slots 316, 332. An O-ring 350 is disposed between the head of the screw 342 and the cover 346 act as a spring pushing the cover 346 against the housing 300 in order to prevent the entry of snow and water. The cover 346 moves along the outer surface of the housing 300 with the shaft 320 as the shaft 320 is moved along the rotation axis 324. For this reason, the cover 346 is also used as a position indicator. The cover 346 is provided with triangular projections 352 that provide an indication of the position of the shaft 320, and therefore of the ski runner 106, along markings 354 formed on the outer front surface of the housing 300. To ensure that the screw 342 is not screwed too far into the aperture 344 of the shaft 320, which would squeeze the cover 346 between the screw head of the screw 342 and the outer surface of the housing 300, thereby hindering movement of the shaft 320, the screw 320 has a shoulder that abut the bottom of the counterbore of the aperture 344 once it has been sufficiently screwed in the aperture 344.

In order to turn the shaft 318, a knob 356 is mounted over the portion of the shaft 318 protruding from the top of the housing 300. The knob 356 is fixed to the shaft 318 by a screw 358. To prevent the knob 356 from turning relative to the shaft 318, the central portion of the knob 356 disposed over the shaft 318 has a polygonal shape and the top portion of the shaft 318 has a corresponding polygonal shape. Alternatively, the central portion of the knob 356 and the top portion of the shaft 318 could be splined, keyed, or circular but for corresponding flat surface for example. The knob 356 has a generally oval cross-section (as viewed from above), with a number of teeth 360 protruding from its sides to facilitate gripping of the knob 356 by the user.

Although the shaft 320 can have an infinite number of positions within its range of positions, in order to make it easier for the user to set the same position on both the left and right ski assemblies 100, the runner adjustment assembly provides auditory and haptic feedbacks to the user at a number of pre-set positions. To provide the auditory and haptic feedbacks, the housing 300 has a pair of notches 362 along the top edge thereof which are selectively engaged by a clicker 364. The clicker 364 is an annulus disposed in the knob 356 that is biased against the top edge of the housing 300 by a spring 366. The clicker 364 has a pair of protrusions on the bottom thereof. When the knob 356 is turned, the protrusions on the bottom of the clicker 364 eventually fall into the notches 362 thereby producing a clicking sound. The spring 366 provides some resistance to turning the knob 356 to make the protrusions on the bottom of the clicker 364 come out of the notches 362 thereby provide a haptic feedback that a pre-set position has been reached. As the notches 362 are provided on opposite sides of the housing 300, the pre-set positions correspond to every half turn of the knob 356. It is contemplated that only one or more than two notches 362 could be provided. It is also contemplated that only one or more than two protrusions could be provided on the bottom of the clicker 364. It is also contemplated that the number of notches 362 and the number of protrusions provided on the bottom of the clicker 364 could differ. It is contemplated that the clicker 364 and its associated component could be omitted and that the user could rely only the position indicator (i.e. cover 346) and markings 354 to determine the position of the shaft 320, and therefor the ski runner 106. It is contemplated that the position indicator (i.e. cover 346) and markings 354 could also be omitted. It is contemplated that other means could be provided to determine the position of the ski runner 106 relative to the ski 102, such as, for example, level markings on the side of the ski runner 106.

To connect the shaft 320 to the ski runner 106, a pair of bent arms 368 is connected to lower portion of the shaft 320. It is contemplated that the arms 368 and the shaft 368 could be integrally formed. Each arm has an aperture 370. The ski runner 106 is inserted between the arms 368 with the arcuate slot 218 aligned with the apertures 370 and a connector in the form of a pin 372 (FIG. 9) is inserted into the apertures 370 of the arms 370 and the arcuate slot 218, thereby connecting the ski runner 106 to the runner adjustment assembly 108. The pin 372 defines a laterally extending runner connection axis 374. As can be seen in FIG. 9, the runner connection axis 374 is disposed vertically below the ski pivot axis 112. The arms 368 and the pin 372 are received in the wider longitudinal central portion 160 of the slot 114 of the ski body 140 (FIG. 3). The sides of the wider longitudinal central portion 160 of the slot 114 limit the lateral movement of the pin 372. As can be seen by comparing FIG. 9 to FIG. 13, when the ski 102 pivots about the ski pivot axis 112 as shown in FIG. 12, the pin 372 moves inside the arcuate slot 218 of the ski runner 106. It is contemplated that in an alternative implementation the arms 368 could be provided with arcuate slots and that the ski runner 106 could have a circular aperture to receive the pin 372.

The pin 372 is the only connection between the ski runner 106 and any other part of the ski assembly 100 such that the ski runner 106 is held in place with respect to the ski 102 by the adjustment mechanism and the ski leg 104. As such, forces applied to the ski runner 106 are transferred to the adjustment mechanism 302 by the connection provided therebetween by the pin 372, then from the adjustment mechanism 302 to the housing 300 by the connection provided therebetween by the bearing 322, and the from the housing 300 to the ski leg 104 by the connection provided therebetween by the bolt 110 and the axle 111. As can be seen in FIG. 9, the bolt 110 is disposed vertically between the pin 372 and the bearing 322.

To adjust the position of the ski runner 106 relative to the ski 102 to change the amount by which the ski runner 106 protrudes from the keel 142, a user only needs to turn the knob 356. When the knob 356 is turned, the shaft 320 moves along the rotation axis 324, which in turn causes the pin 372, and therefore the runner connection axis 374, to move in the same direction along an adjustment axis 376 (FIG. 9) parallel to the rotation axis 324. The displacement of the pin 372 causes the ski runner 106 to move also. Since the walls 202, 204 abut the walls 164, 168 of the ski body 140 defined by the slot 114, the ski runner 106 translates along a translation axis 378 (FIG. 9) that is parallel to these walls 202, 204, 164, 168. The ski runner 106 remains rotationally fixed relative to the ski 102 as it translates inside the slot 114 along the translation axis 378. It is recognized that there may be a small amount of rotation of the ski runner 106 relative to the ski 102 due to the clearance between the ski runner 106 and the ski 102 required to permit translation of the ski runner 106, but the ski runner 106 is nonetheless considered to be rotationally fixed relative to the ski 102 for purposes of the present application. As can be seen in FIG. 9, when the snowmobile 10 is on flat, level ground, the translation axis 378 is vertical and perpendicular to the ground engaging edge 206 of the ski runner body 200. It is contemplated that the translation axis 378 could not be perpendicular to the ground engaging edge 206 of the ski runner body 200. As can also be seen in FIG. 9, when the snowmobile 10 is on flat, level ground, the ski leg pivot axis 134, the adjustment axis 376 and the rotation axis 324 are angled relative to the translation axis 378. It is contemplated that the runner adjustment assembly 108 could be modified such that the adjustment axis 376 and the rotation axis 324 are parallel to the translation axis 378.

Figure 10:
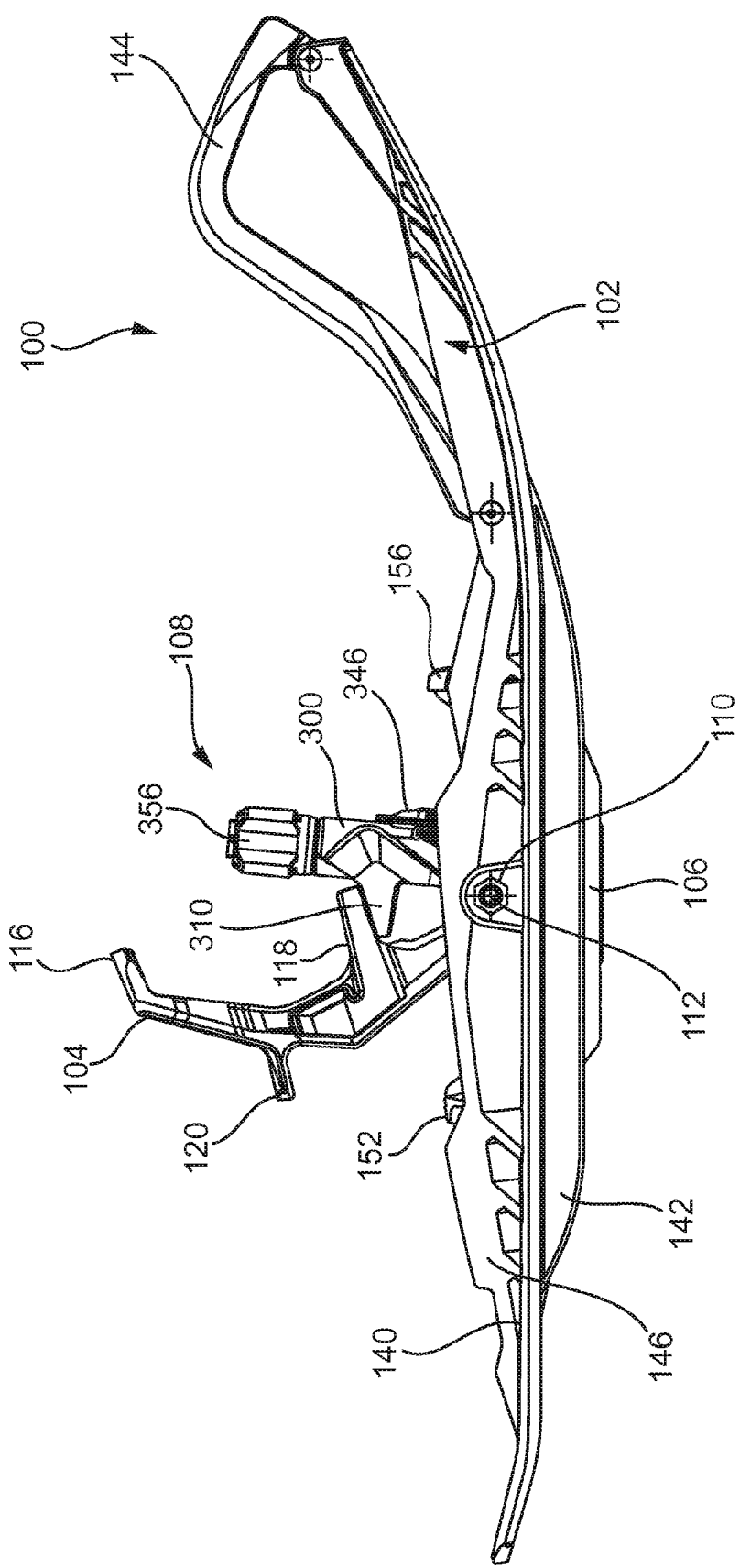
FIG. 10 is a right side elevation view of the ski assembly of FIG. 2 with the ski runner in a lowered position.
Figure 11:
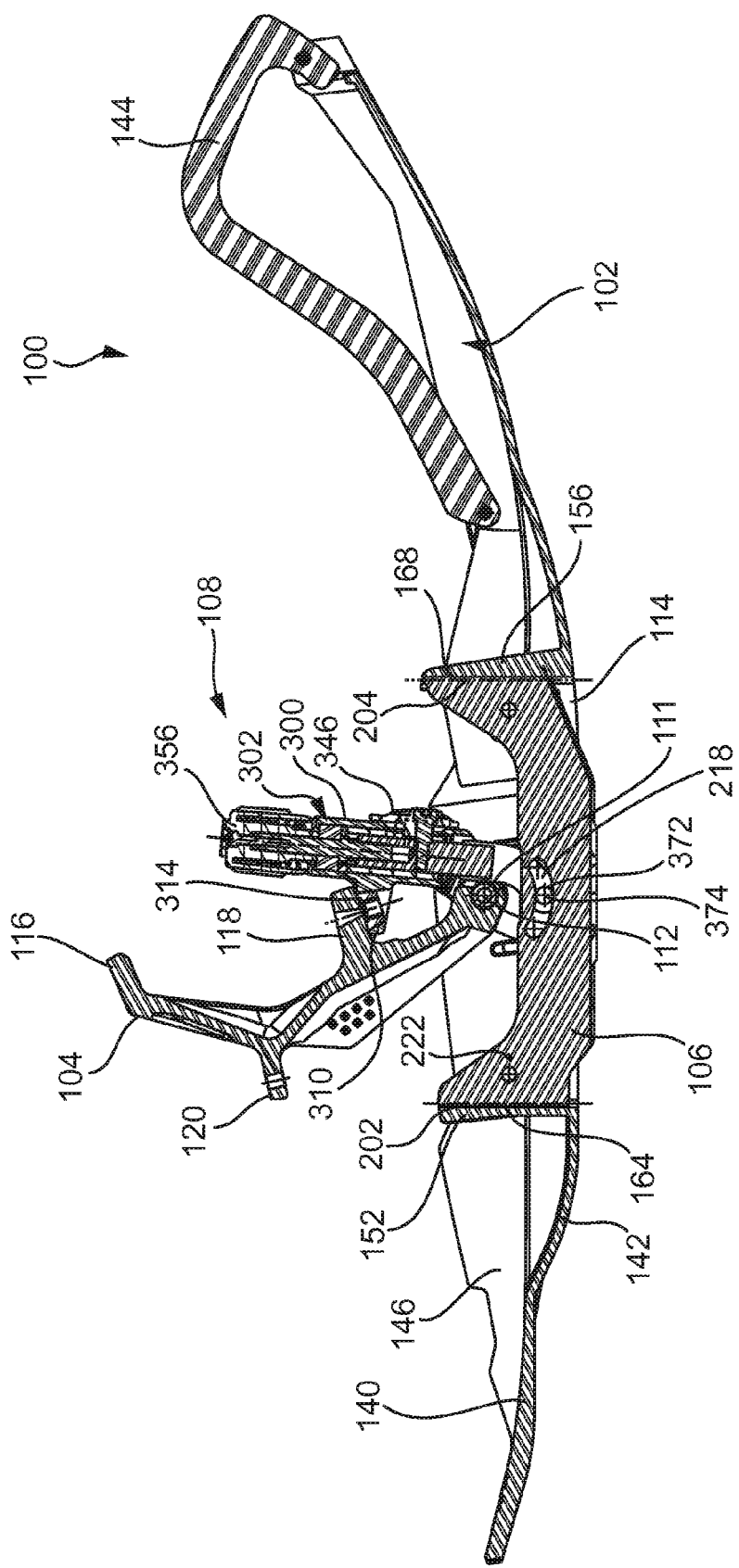
FIG. 11 is a cross-sectional view of the ski assembly of FIG. 2 taken through the longitudinal centerline of the ski assembly with the ski runner in the lowered position of FIG. 10.
Figure 12:
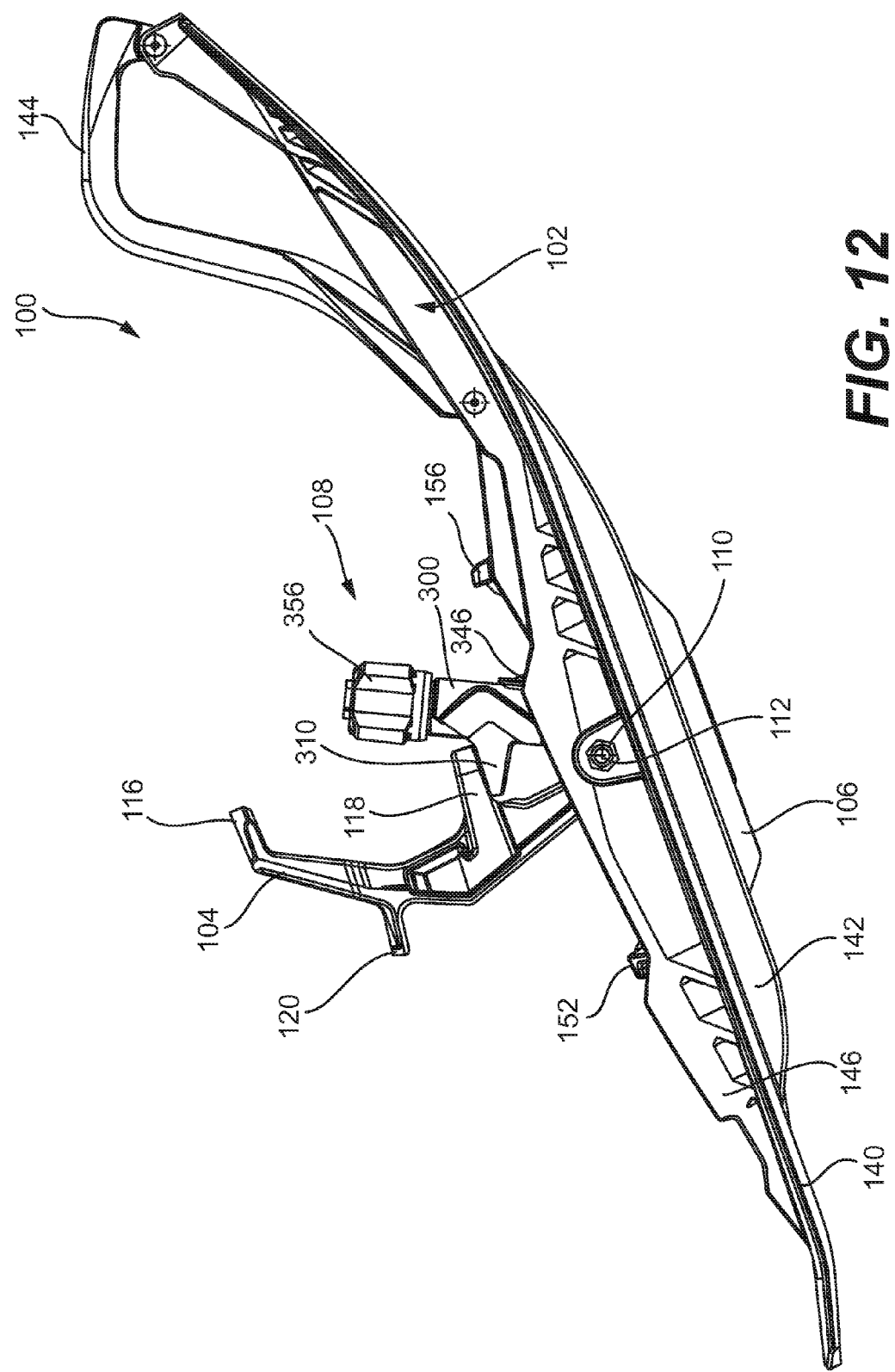
FIG. 12 is a right side elevation view of the ski assembly of FIG. 2 with a front of the ski pivoted upward.
Figure 13:
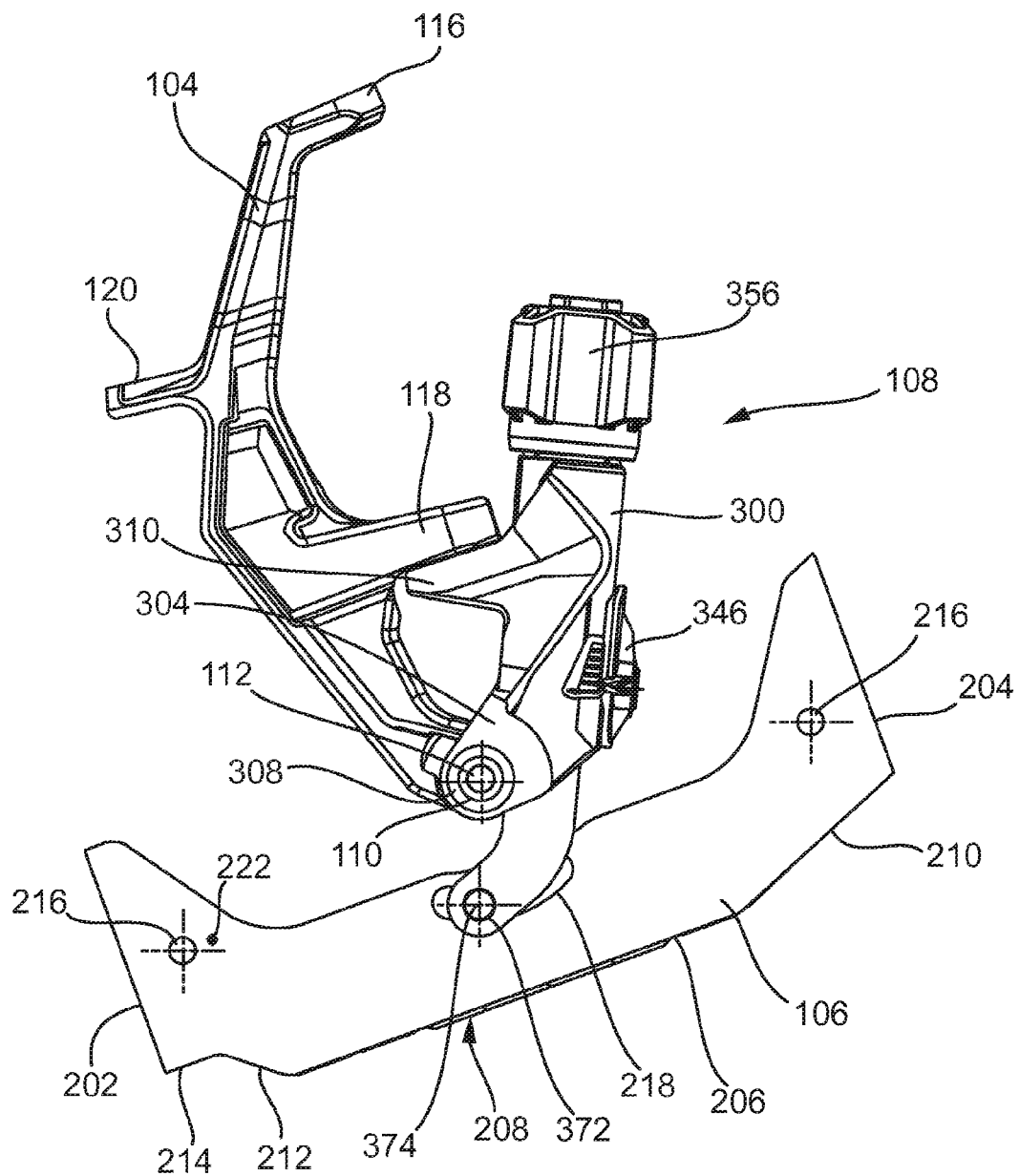
FIG. 13 is a right side elevation view of the ski assembly positioned as in FIG. 12 with the ski removed.

Starting from the position of the ski runner 106 shown in FIGS. 8 and 9, by turning the knob 356 in one direction, the runner adjustment assembly 108 moves the pin 372 down along the adjustment axis 376 which causes the ski runner 106 to translate down along the translation axis 378 to a position, such as the one shown in FIGS. 10 and 11, where the distance between the bottom of the ski runner 106 and the bottom of the ski 102 is greater than in the position shown in FIGS. 8 and 9. It should be understood that the ski runner 106 could be positioned at positions intermediate the ones shown in FIGS. 8 and 9 and FIGS. 10 and 11. The ski runner 106 can also be adjusted so as to be in a position where it extends further from the keel 142 than in the position shown in FIGS. 10 and 11. By turning the knob 356 in the opposite direction, the runner adjustment assembly 108 moves the pin 372 up along the adjustment axis 376 which causes the ski runner 106 to translate up along the translation axis 378 up to the uppermost position of the ski runner 106 shown in FIGS. 8 and 9.

Figure 17:
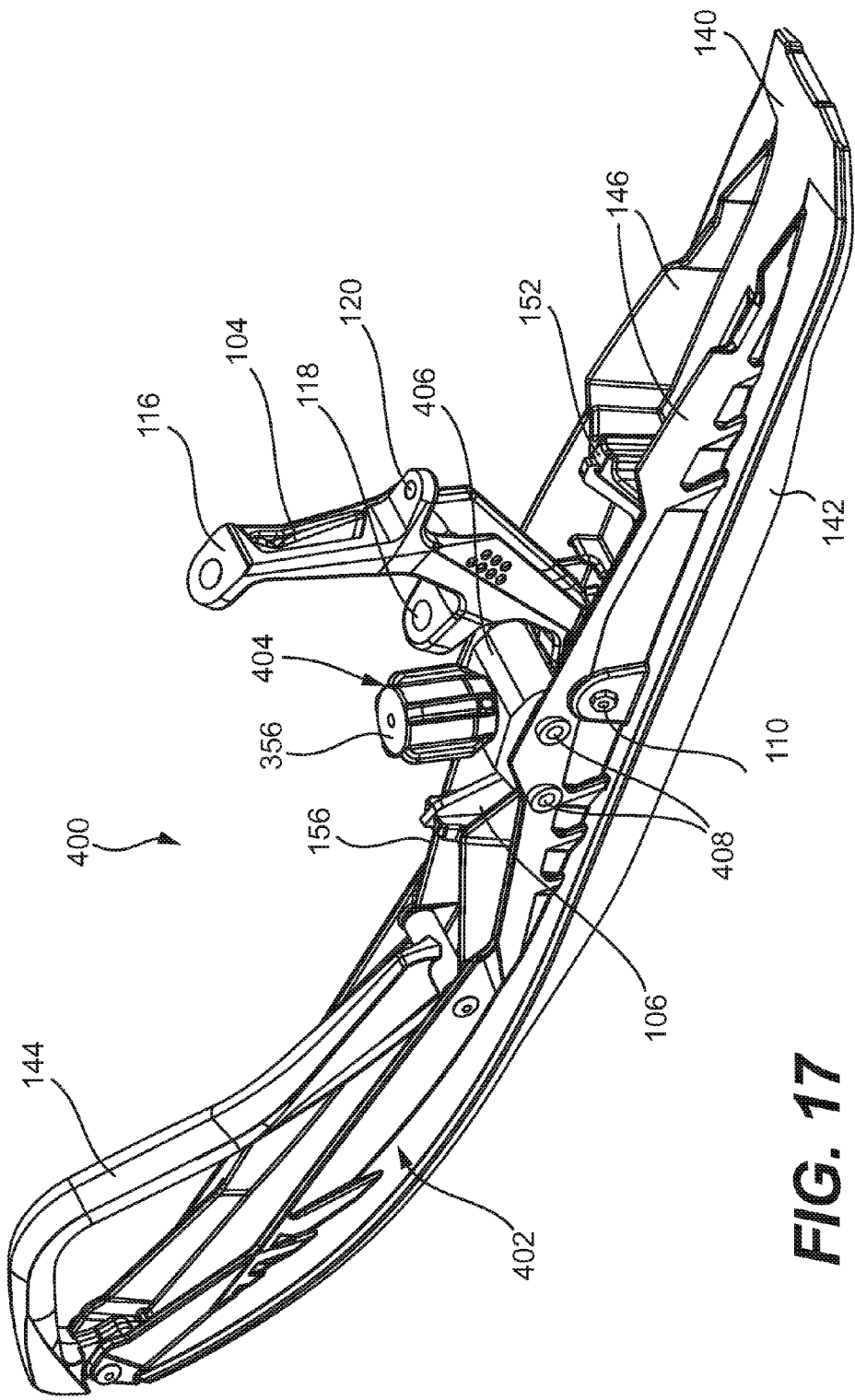
FIG. 17 is a perspective view taken from a rear, left side of an alternative implementation of a left ski assembly of the snowmobile of FIG. 1.
Figure 18:
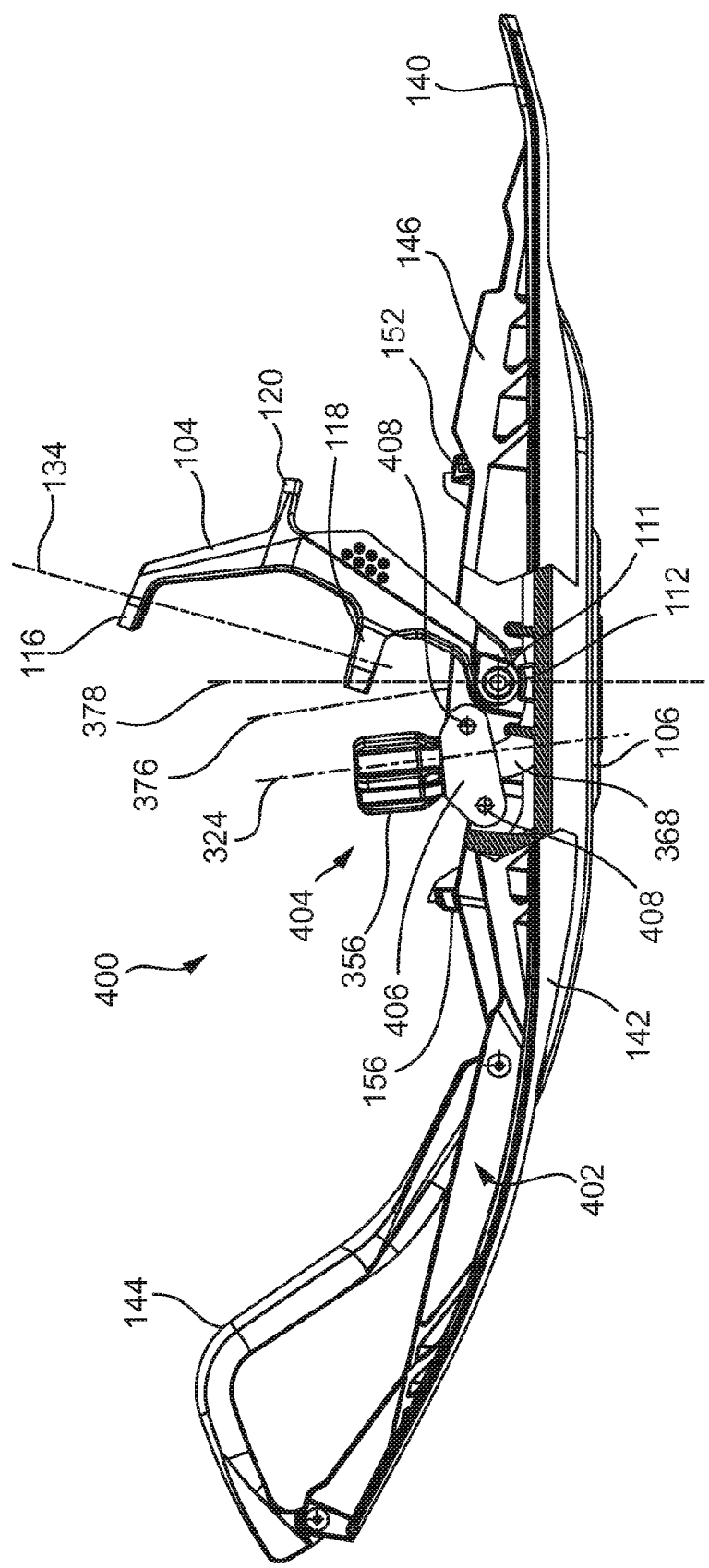
FIG. 18 is a left side elevation view of the ski assembly of FIG. 17 with a portion shown in cross-section.

Turning now to FIGS. 17 and 18, an alternative implementation of the snowmobile ski assembly 100 will be described. FIGS. 17 and 18 illustrate a snowmobile ski assembly 400. For simplicity, elements of the ski assembly 400 that are similar to those of the ski assembly 100 described above have been numbered with the same reference numerals and will not be described again.

The ski assembly 400 shown in FIGS. 17 and 18 is a left ski assembly 400. The left ski assembly 400 includes a left ski 402, a left ski leg 104, a left ski runner 106 and a left runner adjustment assembly 404. In the right ski assembly 400, the right ski 402, the right ski runner 106 and the right runner adjustment assembly 404 are identical to those of the left ski assembly 400 and the right ski leg 104 is a mirror image of the left ski leg 104. Accordingly, for simplicity, only the left ski assembly 400 will be described in detail herein. It is contemplated that both ski legs 104 could be identical, or that the ski legs 104 could have features that differ from each other. It is contemplated that one or more of the right ski 402, the right ski runner 106 and the right runner adjustment assembly 404 could be a mirror image of those of the left ski assembly 400 or could have one or more features that differ from those of the left ski assembly 400. It is contemplated that in some implementation of the ski assembly 400, such as in a replacement ski assembly for replacing an existing ski of a snowmobile 10, the ski leg 104 could be omitted as a suitable ski leg 104 may already be provided on the snowmobile 10.

In the ski assembly 400, the ski leg 104 and the ski runner 106 are the same as those of the ski assembly 100 described above. The ski 402 is the same as the ski 102 described above except for two apertures in each longitudinally extending wall 146 that are used to fasten the runner adjustment assembly 404 to the ski 402. The runner adjustment assembly 404 differs from the runner adjustment assembly 108 as will be described below.

The ski leg 104 is connected to the ski 402 in the same manner as the ski leg 104 is connected to the ski 102 in the ski assembly 100 described above. The runner adjustment assembly 404 has a housing 406 disposed between the walls 146. Two fasteners 408 are inserted through the apertures in the walls 146 of the ski 402 and through apertures in the housing 406 to fasten the runner adjustment assembly 404 to the ski 402. As such, the runner adjustment assembly 404 is fixed to the ski 402 and the runner adjustment assembly 404 pivots about the ski pivot axis 112 as the ski 402 pivots about the ski pivot axis 112.

The runner adjustment assembly 404 is connected to the ski runner 106 by a pin (not shown, but similar to pin 372) passing through the arms 368 of the runner adjustment assembly 404 and the arcuate slot 218 of the ski runner 106. The runner adjustment assembly 404 has an adjustment mechanism (not shown) disposed in part in the housing 406. The adjustment mechanism of the runner adjustment assembly 404 is similar to the adjustment mechanism 302 of the runner adjustment assembly 108. As in the runner adjustment assembly 108, to cause the lower shaft (not shown, but similar to the shaft 320 described above) of the runner adjustment assembly 404 to move along a rotation axis 324

(FIG. 18), a knob 356 of the runner adjustment assembly 404 is turned. As in the runner adjustment assembly 108, movement of the lower shaft of the runner adjustment assembly 404 causes the pin connecting the runner adjustment assembly 404 to the ski runner 106 along an adjustment axis 376 parallel to the rotation axis 324, which causes the ski runner 106 to translate along a translation axis 378 (see FIG. 18). As can be seen in FIG. 18, when the snowmobile 10 is on flat, level ground, the translation axis 378 is vertical and the ski leg pivot axis 134, the adjustment axis 376 and the rotation axis 324 are angled relative to the translation axis 378. It is contemplated that the runner adjustment assembly 404 could be modified such that the adjustment axis 376 and the rotation axis 324 are parallel to the translation axis 378, in which case the arcuate slot 218 could be replaced by a circular aperture. Vertical forces applied upward to the ski runner 106 are transferred to the runner adjustment assembly 404 and not to the ski 102.

Figure 19:
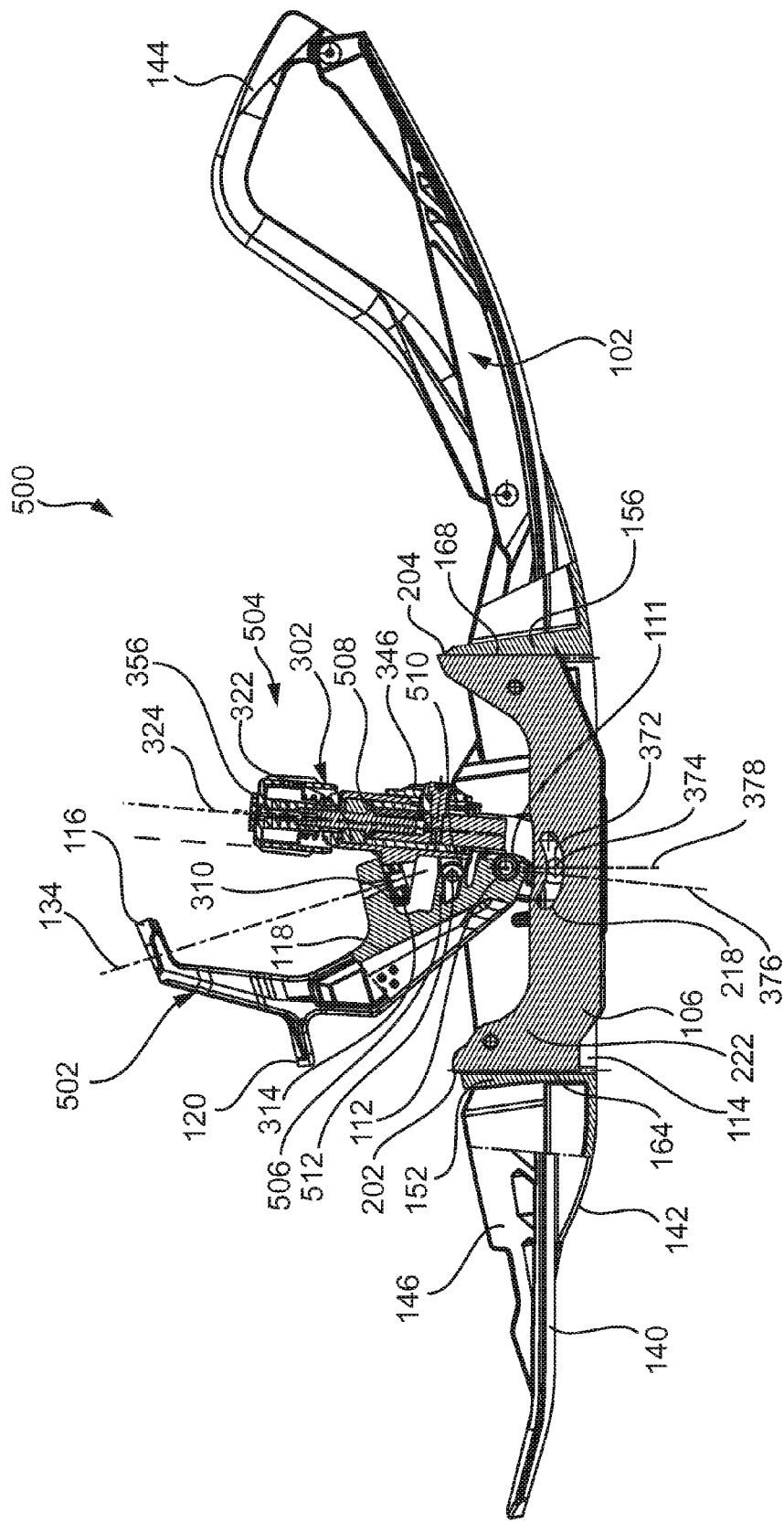
FIG. 19 is a right side elevation view of another alternative implementation of a left ski assembly of the snowmobile of FIG. 1 with a portion shown in cross-section.

Turning now to FIG. 19, another alternative implementation of the snowmobile ski assembly 100 will be described. FIG. 19 illustrates a snowmobile ski assembly 500. For simplicity, elements of the ski assembly 500 that are similar to those of the ski assembly 100 described above have been numbered with the same reference numerals and will not be described again.

The ski assembly 500 shown in FIG. 19 is a left ski assembly 500. The left ski assembly 500 includes a left ski 102, a left ski leg 502, a left ski runner 106 and a left runner adjustment assembly 504. In the right ski assembly 500, the right ski 102, the right ski runner 106 and the right runner adjustment assembly 504 are identical to those of the left ski assembly 500 and the right ski leg 502 is a mirror image of the left ski leg 502. Accordingly, for simplicity, only the left ski assembly 500 will be described in detail herein. It is contemplated that both ski legs 502 could be identical, or that the ski legs 502 could have features that differ from each other. It is contemplated that one or more of the right ski 102, the right ski runner 106 and the right runner adjustment assembly 504 could be a mirror image of those of the left ski assembly 500 or could have one or more features that differ from those of the left ski assembly 500. It is contemplated that in some implementation of the ski assembly 500, such as in a replacement ski assembly for replacing an existing ski of a snowmobile 10, the ski leg 502 could be omitted as a suitable ski leg 502 may already be provided on the snowmobile 10.

In the ski assembly 500, the ski 102 and the ski runner 106 are the same as those of the ski assembly 100 described above. The ski leg 502 is the same as the ski leg 102 described above except for a front tab 506 disposed vertically between the tab 118 and the ski pivot axis 112. The tab 506 is used to fasten the runner adjustment assembly 504 to the ski leg 502. The ski leg 502 is connected to the ski 102 in the same manner as the ski leg 104 is connected to the ski 102 in the ski assembly 100 described above.

The runner adjustment assembly 504 is the same as the runner adjustment assembly 108 described above except that the housing 300 has been replaced with a housing 508. In the housing 508, the two tabs 304 of the housing 300 have been replaced with two tabs 510. The tabs 510 are disposed on either side of the front tab 506 of the ski leg 502. A fastener 512 is inserted laterally through apertures in the tabs 510 and the tab 506 to fasten the housing 508, and therefore the runner adjustment assembly 504, to the ski leg 502. As such, the runner adjustment assembly 504 is fixed to the ski leg 502 and the ski 102 pivots about the ski pivot axis 112 relative to the runner adjustment assembly 504. As can be seen in FIG. 19, when the snowmobile 10 is on flat, level ground, the translation axis 378 is vertical and the ski leg pivot axis 134, the adjustment axis 376 and the rotation axis 324 are angled relative to the translation axis 378. It is contemplated that the runner adjustment assembly 504 could be modified such that the adjustment axis 376 and the rotation axis 324 are parallel to the translation axis 378.

The runner adjustment assembly 504 is connected to the ski runner 106 by a pin 372 passing through the arms 368 of the runner adjustment assembly 504 and the arcuate slot 218 of the ski runner 106 as in the runner adjustment assembly 108. The runner adjustment assembly 504 has the same adjustment mechanism 302 as the runner adjustment assembly 108. Therefore, the position of the ski runner 106 is adjusted by turning the knob 356 as in the ski assembly 100. Vertical forces applied upward to the ski runner 106 are transferred to the runner adjustment assembly 504 and not to the ski 102.

Figure 20:
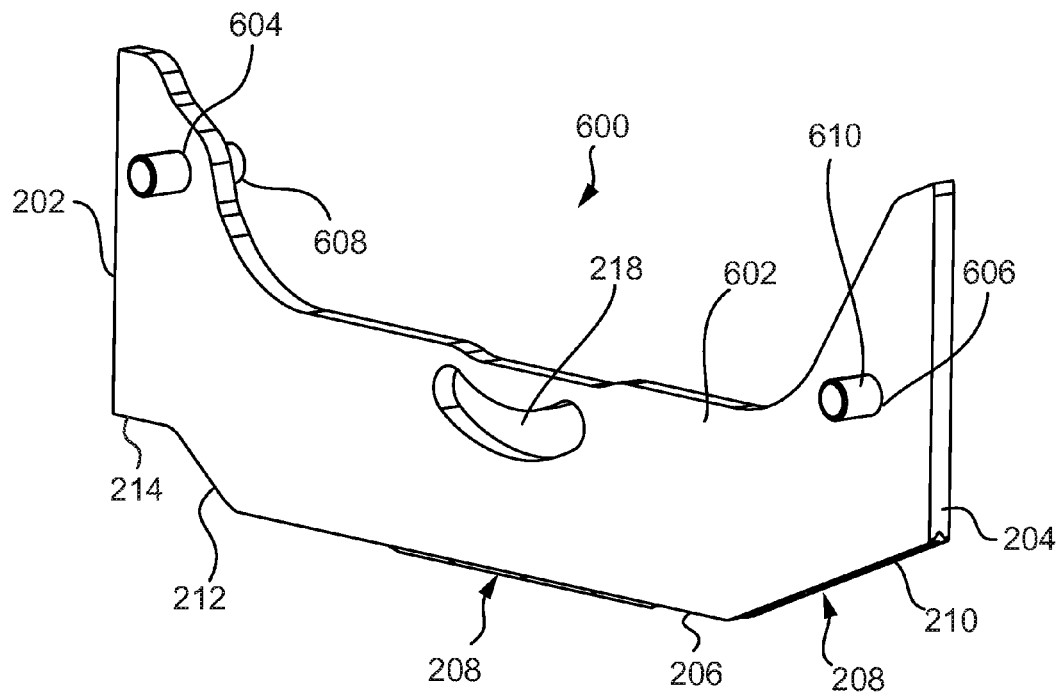
FIG. 20 is a perspective view taken from a front, right side of an alternative implementation of a ski runner.

Turning now to FIG. 20, an alternative implementation of the ski runner 106 will be described. FIG. 20 illustrates a ski runner 600. For simplicity, elements of the ski runner 600 that are similar to those of the ski runner 106 described above have been numbered with the same reference numerals and will not be described again.

In the ski runner 600, the ski runner body 200 defining the apertures 216 and the pin 222 of the ski runner 106 have been replaced with a ski runner body 602 defining apertures 604, 606 and pins 608, 610. The pins 608, 610 are inserted through the apertures 604, 606 respectively. The aperture 604 and the pin 608 are disposed near the rear wall 202 of ski runner body 602. The aperture 606 and the pin 610 are disposed near the front wall 204 of ski runner body 602. As can be seen, the aperture 606 and the pin 610 are lower than the aperture 604 and the pin 608.

The pins 608, 610 have two functions: they help prevent the ski runner 600 from being inserted backwards when assembly the ski assembly and they also limit the amount by which the ski runner 600 can be lowered. The ski runner 600 is intended for use on a ski having walls (similar to the walls 158 described above) extending longitudinally forward from the wall 152 in an alternative implementation of the ski 102. It is contemplated that the runner 600 could be used with the ski 102 by having the aperture 606 and the pin 610 higher on the ski runner body 602 and the aperture 604 and the pin 608 lower on the ski runner body 602.

Should the ski runner 600 be inserted backwards in the slot 114 (i.e. with the rear wall 202 at the front and the front wall 204 at the rear), when the ski runner 600 is lowered in the slot 114, the pin 610 makes contact with the walls extending longitudinally forward of wall 156, thereby preventing the ski runner 600 from being sufficiently lowered in the slot 114 for proper installation.

During adjustment of the ski runner 600, lowering the ski runner 600 relative to the ski will eventually cause the pin 608 to abut the top of the walls extending longitudinally forward of the wall 156 and the pin 610 to abut the top of the surfaces disposed adjacent the slot 114 in the ski (i.e. surfaces similar to surfaces 612 in FIG. 4). As a result, the ski runner 600 cannot be extended any lower.

Figure 21:
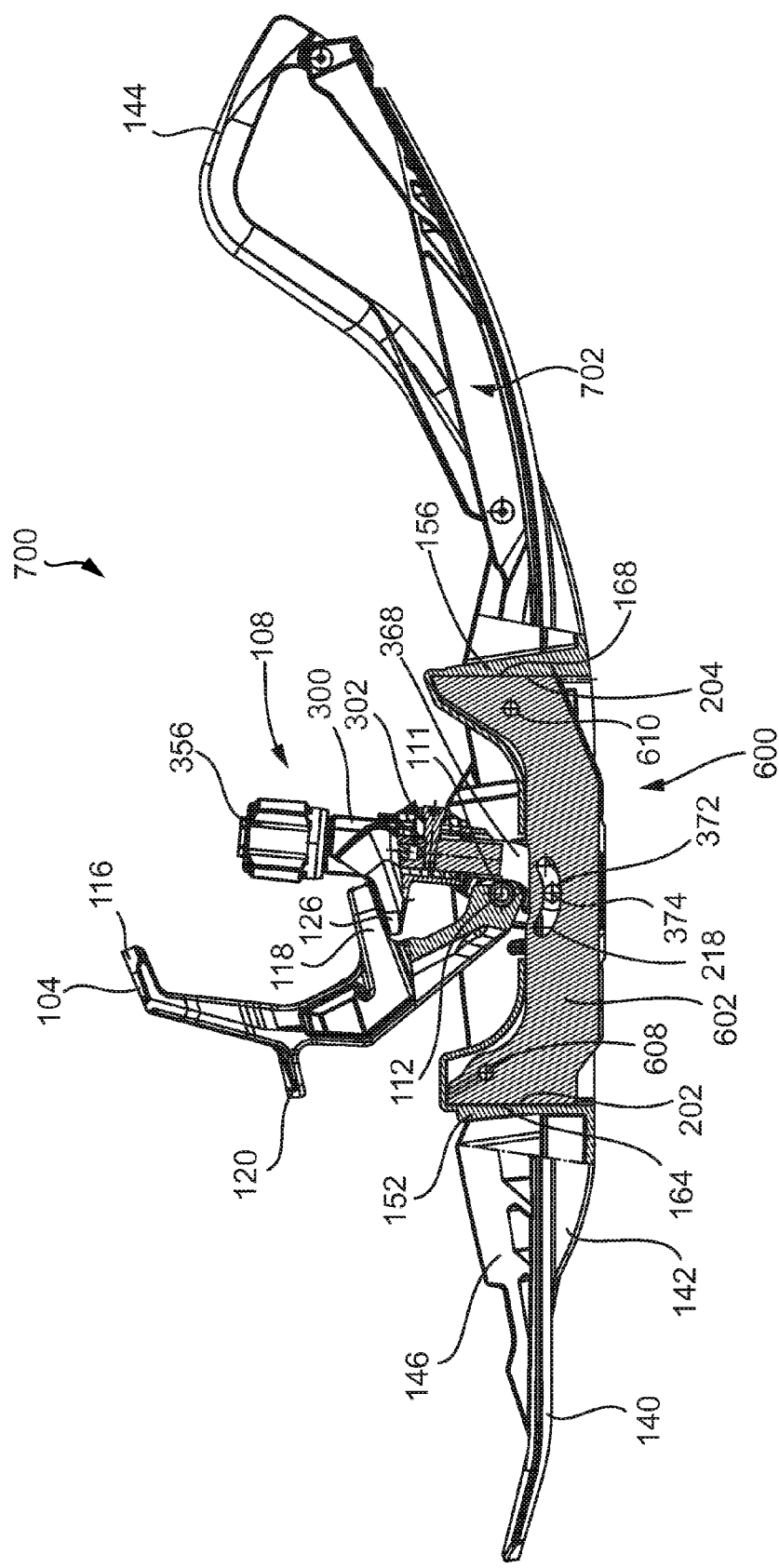
FIG. 21 is a right side elevation view of another alternative implementation of a left ski assembly of the snowmobile of FIG. 1 with a portion shown in cross-section.

Turning now to FIG. 21, another alternative implementation of the snowmobile ski assembly 100 will be described. FIG. 21 illustrates a snowmobile ski assembly 700. For simplicity, elements of the ski assembly 700 that are similar to those of the ski assembly 100 described above have been numbered with the same reference numerals and will not be described again.

The ski assembly 700 shown in FIG. 21 is a left ski assembly 700. The left ski assembly 700 includes a left ski 702, a left ski leg 104, a left ski runner 600 and a left runner adjustment assembly 108. In the right ski assembly 700, the right ski 702, the right ski runner 600 and the right runner adjustment assembly 108 are identical to those of the left ski assembly 700 and the right ski leg 104 is a mirror image of the left ski leg 104. Accordingly, for simplicity, only the left ski assembly 700 will be described in detail herein. It is contemplated that both ski legs 104 could be identical, or that the ski legs 104 could have features that differ from each other. It is contemplated that one or more of the right ski 702, the right ski runner 600 and the right runner adjustment assembly 108 could be a mirror image of those of the left ski assembly 700 or could have one or more features that differ from those of the left ski assembly 700. It is contemplated that in some implementation of the ski assembly 700, such as in a replacement ski assembly for replacing an existing ski of a snowmobile 10, the ski leg 104 could be omitted as a suitable ski leg 104 may already be provided on the snowmobile 10.

In the ski assembly 700, the ski leg 104 and the runner adjustment assembly 108 are the same as those of the ski assembly 100 described above. The ski runner 600 is the ski runner 600 described above with respect to FIG. 20. The ski leg 104 is connected to the ski 702 in the same manner as the ski leg 104 is connected to the ski 102 in the ski assembly 100 described above. The runner adjustment assembly 108 is connected to the ski leg 104 in the same manner as in the ski assembly 100 described above. The runner adjustment assembly 108 is connected to the ski runner 600 in the same manner as the runner adjustment assembly 108 is connected to the ski runner 600 in the same manner as the runner adjustment assembly 108 is connected to the ski runner 106 in the ski assembly 100 described above.

In the ski 702, the slot 114 of the ski 102 has been replaced by a slot 704. The slot 704 is defined in the keel 142 and the ski body 140, opens at a bottom of the keel 142 but is partially closed by a wall 706 at a top thereof. As can be seen, the ski runner 600 is received in the slot 704. In order to permit the connection between the runner adjustment assembly 108 and the ski runner 600, the wall defines an aperture 708 through which the arms 368 of the runner adjustment assembly 108 extend. As can also be seen in FIG. 21, the wall 706 limits the amount by which the ski runner 600 can be raised relative to the ski 702 by abutting the top of the ski runner 600 when the ski runner 600 reaches the position shown in FIG. 21 as it is being raised. Also, in order to accommodate the ski runner 600, the walls 158 of the ski 108 are omitted in the ski 702, and walls (not shown) extending longitudinally forward from the wall 152 are provided in the ski 702. Vertical forces applied upward to the ski runner 600 are transferred to the runner adjustment assembly 108 and not to the ski 702 unless the ski runner 600 abuts the wall 706.

Figure 24:
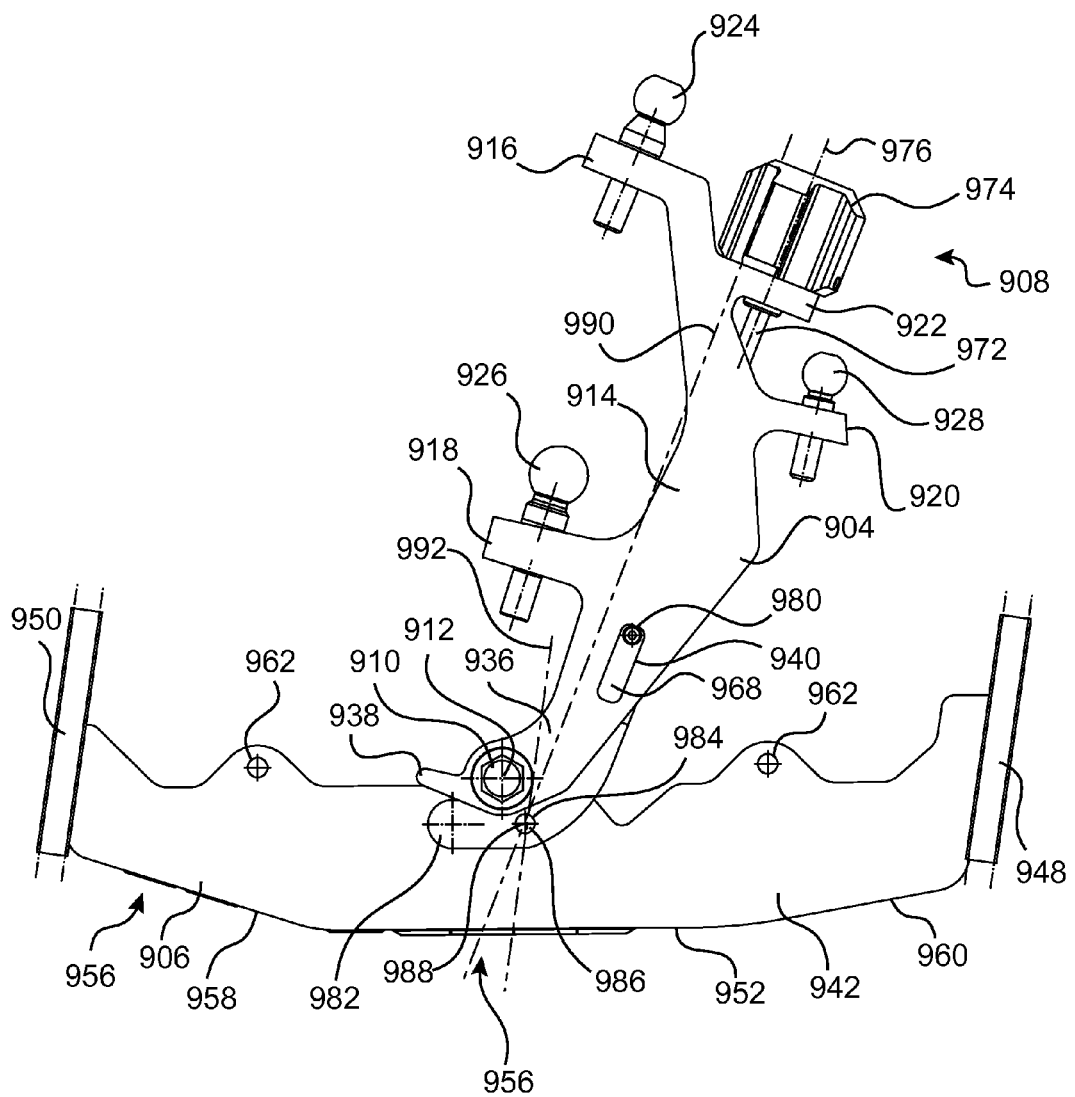
FIG. 24 is a left side elevation view of the ski leg, the runner adjustment assembly and the ski runner of FIG. 22.

Turning now to FIGS. 22 to 24, an alternative implementation of a left ski leg 904, a left ski runner 906 and a left runner adjustment assembly 908 to be provided on a left ski (not shown) of an alternative implementation of a left ski assembly will be described. A corresponding right ski assembly is a mirror image of this left ski assembly. Accordingly, for simplicity, only the left ski assembly will be described in detail herein. It is contemplated that both left and right ski assemblies could be identical, or that the ski assemblies could have features that differ from each other.

The ski of the present alternative implementation of the ski assembly is similar to the ski 102, but has some differences that will be described below.

The ski leg 904 is pivotally connected to the ski by a bolt 910. It is contemplated that another type of fastener such as a rivet could be used for example. The bolt 910 defines a laterally extending ski pivot axis 912 about which the ski pivots relative to the ski leg 904. The runner adjustment assembly 908 is housed in part in the ski leg 904 and is therefore connected to the bolt 910 by the ski leg 904. As such, the ski also pivots about the ski pivot axis 912 relative to the runner adjustment assembly 908. As in the previous implementations, the ski runner 906 is inserted in a slot defined in the ski. The runner adjustment assembly 908 is connected to the ski runner 906. The runner adjustment assembly 908 is used to translate the ski runner 906 inside the slot of the ski to change an amount by which the ski runner 906 extends below the ski, as will be described in greater detail below. By changing the amount by which the ski runner 906 extends below the ski, the corresponding ski assembly can be adjusted for different riding conditions. The ski runner 906 is connected to the ski leg 904 via the runner adjustment assembly 908. As such, the ski only bears a vertical load when its bottom surface is in contact with a surface on which the snowmobile 10 rides.

The ski leg 904 has a central portion 914, an upper front tab 916, a lower front tab 918, a lower rear tab 920 and an upper rear tab 922. A ball joint 924 (partially shown) is inserted through the upper front tab 916 to connect the ski leg 904 to the end of the upper A-arm 50. A ball joint 926 (partially shown) is inserted through the lower front tab 918 to connect the ski leg 904 to the end of the lower A-arm 52. A ball joint 928 (partially shown) is inserted through the lower rear tab 920 to connect the ski leg 904 to the end of the steering rod 60. When the driver of the snowmobile 10 turns the handlebar 58, the steering rod 60 pushes or pulls, as the case may be, on the lower rear tab 920. As a result, the ski leg 904 pivots about a ski leg pivot axis 930 (FIG. 23) passing through the centers of the ball joints 924, 926. As best seen in FIG. 23, the runner adjustment assembly 908 passes through an aperture 932 defined in the upper rear tab 914 and an aperture 934 defined in the central portion 914 as will be discussed in greater detail below. The apertures 932, 934 are coaxial. The ski leg 904 also has two arms 936 extending downward from the central portion 914. The arms 936 are disposed on either side of the lower part of the runner adjustment assembly 908 and of the runner 906. The bolt 910 extends through the arms 936. Each arm 936 has a protrusion 938. The protrusions 938 selectively abut a stopper (not shown) on the ski to limit the rotation of the ski relative to the ski leg 904 about the axis 912. The central portion 914 defines two windows 940 (FIG. 24, one on each side, only one being shown) that communicate with the aperture 934, the function of which will be described below.

The ski runner 906 will now be described in more detail. The ski runner 906 has a ski runner body 942 cut, by stamping for example, from a metal plate. As a result, the ski runner body 942 is flat and has a uniform width. It should be understood that the surface of the ski runner body 942 could be engraved or embossed, to write the manufacturer's name for example, in which case the surface would nonetheless be considerer as having a generally uniform width. It is contemplated that the ski runner body 942 could be made from other materials and by other manufacturing techniques. For example, the ski runner body 942 could be machined, laser cut or cast.

The ski runner body 942 has a rear flat wall 944 and a front flat wall 946. The flat walls 944, 946 are parallel to each other. The walls 944, 946 are received in grooves defined by inserts 948, 950 respectively. The insert 948 is disposed between the rear flat wall 944 and the rear wall of the slot in which the ski runner 906 is inserted (i.e. a wall similar to the rear wall 164 of the slot 114 of the ski 102). The insert 950 is disposed between the front flat wall 946 and the front wall of the slot in which the ski runner 906 is inserted (i.e. a wall similar to the front wall 168 of the slot 114 of the ski 102). It is contemplated that the inserts 948, 950 could be omitted, in which case the flat walls 944, 946 would abut the rear and front walls of the slot in the ski. It is also contemplated that inserts similar to the inserts 948, 950 could be provided in the other implementations of ski assemblies described above. When the ski runner 906 is translated in the slot of the ski, the wall 944 of the ski runner body 942 translates along the insert 948 and the wall 946 of the ski runner body 942 translates along the insert 950.

The ski runner body 942 has a lower edge referred to herein as the ground engaging edge 952. The ground engaging edge 952 is straight. It is contemplated that the ground engaging edge 952 could not be straight. For example, the ground engaging edge 206 could be convex. As can be seen, the flat walls 944, 946 are disposed at an acute angle 954 (FIG. 23) relative to the ground engaging edge 952 that is less than 90 degrees but greater than 45 degrees. In one implementation, the angle 954 is between 60 and 90 degrees. It is also contemplated that the angle 954 could be between 60 and 120 degrees. Other angles are also contemplated. Accordingly, the inserts 948, 950 and the front and rear walls of the slot of the ski also extend at the same angle 954 relative to the ground engaging edge 952. It is contemplated the front and rear walls of the slot of the ski could be perpendicular to the ground engaging edge 952 and that the inserts 948, 950 could be modified to abut the perpendicular rear and front walls of the slot of the ski and the angled rear and front flat walls 944, 946 of the ski runner body 942. It is also contemplated that the walls 944, 946 could be perpendicular to the ground engaging edge 952. The ground engaging edge 952 forms a channel inside which are received wearbars 956. The wearbars 956 are brazed to the ski runner body 942. It is contemplated that the wearbars 956 could be connected to the ski runner body 942 by other means. It is also contemplated that the wearbars 956 could be omitted. As would be understood, when the ski assembly operates on a hard surface such as asphalt when the snowmobile 10 has to cross a paved road, because of the wearbars 956, the ground engaging edge 952 does not actually engage the ground, but it is nonetheless referred to as a ground engaging edge for purposes of the present application.

A front angled edge 958 connects the front end of the ground engaging edge 952 to the bottom of the front flat wall 946. The front angled edge 958 also forms a channel inside which wearbars 956 are brazed. A rear angled edge 960 connects the rear end of the ground engaging edge 952 to the bottom of the rear wall 944.

The ski runner body 942 has two apertures 962 defined therein. These are used to hold the ski runner body 942 in place during the manufacturing process. It is contemplated that the apertures 962 could receive pins to limit the amount by which the ski runner 906 can be lowered in the slot of the ski. It is contemplated that the apertures 962 could be omitted. The ski runner body 942 also defines an arcuate slot 964 (FIG. 23) in a central portion thereof.

The runner adjustment assembly 908 will now be described in more detail. The ski leg 904 acts as a housing inside which an adjustment mechanism 966 (FIG. 23) of the runner adjustment assembly 908 is housed in part. As will be explained in greater detail below, actuation of the adjustment mechanism 966 causes the ski runner 906 to be moved up or down inside the slot of the ski.

With reference to FIG. 23, the adjustment mechanism 966 has a shaft 968 having internal threads, a shaft 970 having external threads and a shaft 972. The threaded portion of the shaft 970 is received in the threaded portion of the shaft 968. It is contemplated that the shaft 970 could have the internal thread and that the shaft 968 could have the external thread. An end of the shaft 972 is received in a recess in the shaft 970 and engages the shaft 970 such that the shafts 970 and 972 are rotationally fixed relative to each other (i.e. they turn together). In one implementation, at least the end of the shaft 972 and the recess in the shaft 970 are hexagonal, but other polygonal shapes are also contemplated. In another implementation, the end of the shaft 972 and the recess in the shaft 970 each have at least one corresponding flat side. In other implementations, the shafts 970, 972 engage via a key or splines or by press-fitting. It is also contemplated that the shafts 970, 972 could be bonded, welded or integrally formed. It is contemplated that the shafts 970, 972 could be connected by other means. As the shafts 970 and 972 rotate, the shaft 968 slides in and out of the ski leg 904. Other types of adjustment mechanisms are contemplated.

The shaft 970 and a lower portion of the shaft 972 are received in the aperture 934 defined in the central portion 914 of the ski leg 904 and the top portion of the shaft 972 protrudes from the central portion 914 of the ski leg 904. The top portion of the shaft 972 protrudes through the aperture 932 in the upper rear tab 922.

In order to turn the shafts 970 and 972, a knob 974 is mounted over the top portion of the shaft 972. As can be seen in FIG. 23, the knob 974 sits on top of the upper rear tab 922 and has a portion disposed between the shaft 972 and the contour of the aperture 932. The knob 974 is fixed to the shaft 972 by a screw (not shown). It is contemplated that the knob 974 could be fixed to the shaft 972 by other means. By turning the knob 974, the shafts 970, 972 can rotate about a rotation axis 976. However, the shafts 970, 972 do not slide along the rotation axis 976. The knob 974 prevents the shafts 970, 972 from sliding down along the axis 976 by abutting the top of the upper rear tab 922. The top of the shaft 970 prevents the shafts 970, 972 from sliding up along the axis 976 by abutting a step 978 (FIG. 23) defined by the aperture 934 in the central portion 914 of the ski leg 904.

The shaft 968 is received in aperture 934 inside the central portion 914 of the ski leg 904 and protrudes from a bottom of the central portion 914. Pins 980 (only one shown in FIG. 24) are inserted through the windows 940 defined in the central portion 914 of the ski leg 904 and into the shaft 968. As explained above, turning the shafts 970, 972 cause the shaft 968 to move along the rotation axis 976. The pins 980 abut the sides of the windows 940, thereby preventing the shaft 968 to rotate about the axis rotation 976 with the shafts 970, 972. The pins 980 also prevents the shaft 968 from moving too far down along the rotation axis 976 by coming into contact with the bottom portions of the windows 940, thereby stopping the shaft 968 before the threads of the shafts 968, 970 disengage from each other. The upward movement of the shaft 968 is stopped when the pins 980 come into contact with the top portions of the windows 940.

To connect the shaft 968 to the ski runner 906, a pair of bent arms 982 is connected to the lower portion of the shaft 968. Each arm has an aperture 984. The ski runner 906 is inserted between the arms 982 with the arcuate slot 964 aligned with the apertures 984. Each arm 982 is disposed in part between the ski runner 906 and a corresponding arm 936 of the ski leg 904. A connector in the form of a pin 986 is inserted into the apertures 984 of the arms 982 and the arcuate slot 964, thereby connecting the ski runner 906 to the runner adjustment assembly 908. The pin 986 defines a laterally extending runner connection axis 988. As can be seen, the runner connection axis 988 is disposed vertically below the ski pivot axis 912. It is contemplated that in an alternative implementation, the arms 982 could be provided with arcuate slots and that the ski runner 906 could have a circular aperture to receive the pin 986.

The pin 986 is the only connection between the ski runner 906 and any other part of the ski assembly. As such, forces applied to the ski runner 906 are transferred to the adjustment mechanism 966 by the connection provided therebetween by the pin 986, then from the adjustment mechanism 966 to the ski leg 904.

To adjust the position of the ski runner 906 relative to the ski to change the amount by which the ski runner 906 protrudes from the keel of the ski, a user only needs to turn the knob 974. When the knob 974 is turned, the shaft 968 moves along the rotation axis 976, which in turn causes the pin 986, and therefore the runner connection axis 988, to move in the same direction along an adjustment axis 990 (FIG. 24) parallel to the rotation axis 976. The displacement of the pin 986 causes the ski runner 906 to translate along a translation axis 992 (FIG. 24) that is parallel to the walls 944, 946. As the adjustment axis 990 is not parallel to the translation axis 992, the pin 986 moves along the arcuate slot 964 as the ski runner 906 translates along the translation axis 992. The ski runner 906 remains rotationally fixed relative to the ski as it translates inside the slot along the translation axis 992.

Modifications and improvements to the above-described implementations of the present may become apparent to those skilled in the art. For example, the each ski assembly could be provided with more than one ski runner connected to the runner adjustment assembly. The foregoing description is intended to be exemplary rather than limiting. The scope of the present is therefore intended to be limited solely by the scope of the appended claims.

What is claimed is:

1. A snowmobile ski assembly comprising:
a ski defining a slot;
a ski runner disposed in the slot, the ski runner being translatable in the slot relative to the ski, the ski runner being translatable between a first position and a second position,
a bottom of the ski runner being closer to a bottom of the ski in the first position than in the second position; and
a runner adjustment assembly connected to the ski runner, the runner adjustment assembly selectively translating the ski runner between the first and second positions,
translation of the ski runner occurring as a result of an actuation of a single component of the runner adjustment assembly, wherein the ski runner remains substantially rotationally fixed relative to the ski as the ski runner translates between the first and second positions.

2. The snowmobile ski assembly of claim 1, wherein the ski runner is held in place relative to the ski by the runner adjustment assembly.

3. The snowmobile ski assembly of claim 1, wherein the ski pivots about a laterally extending ski pivot axis; and
wherein the runner adjustment assembly is connected about the ski pivot axis, the ski being pivotable about the ski pivot axis relative to the runner adjustment assembly.

4. The snowmobile ski assembly of claim 3, further comprising a ski leg connected about the ski pivot axis, the ski being pivotable about the ski pivot axis relative to the ski leg.

5. The snowmobile ski assembly of claim 4, wherein the ski runner translates along a translation axis between the first and second positions;
wherein the ski leg is pivotable about a ski leg pivot axis for steering the snowmobile ski assembly; and
wherein the ski leg pivot axis is angled relative to the translation axis when a snowmobile provided with the snowmobile ski assembly is disposed on flat, level ground.

6. The snowmobile ski assembly of claim 3, wherein the runner adjustment assembly has a connector connected to the ski runner and defining a laterally extending runner connection axis;
wherein the runner connection axis is disposed vertically below the ski pivot axis.

7. The snowmobile ski assembly of claim 6, wherein the ski runner translates along a translation axis between the first and second positions;
wherein the runner adjustment assembly moves the runner connection axis along an adjustment axis as the runner adjustment assembly translates the ski runner between the first and second positions; and
wherein the adjustment axis is angled relative to the translation axis when a snowmobile provided with the snowmobile ski assembly is disposed on flat, level ground.

8. The snowmobile ski assembly of claim 1, wherein the ski has a front wall at a front of the slot and a rear wall at a rear of the slot;
wherein the ski runner has a front wall abutting the front wall of the ski and a rear wall abutting the rear wall of the ski;
wherein the ski runner translates along a translation axis between the first and second positions; and
wherein the front and rear walls of the ski, and the front and rear walls of the ski runner are parallel to the translation axis.

9. The snowmobile ski assembly of claim 1, wherein the runner adjustment assembly is connected to the ski runner at a single location.

10. The snowmobile ski assembly of claim 1, wherein the single component is a knob and translation of the ski runner occurs as a result of a turning of the knob.

11. The snowmobile ski assembly of claim 1, wherein the slot extends through the ski.

12. The snowmobile ski assembly of claim 1, wherein the runner adjustment assembly has a pin connecting the runner adjustment assembly to the ski runner, the pin being disposed in the slot defined by the ski, the pin being translatable with the ski runner between the first position and the second position.

13. The snowmobile ski assembly of claim 1, further comprising a ski leg pivotally connected to the ski about a laterally extending ski pivot axis, the ski being pivotable about the ski pivot axis relative to the ski leg; and
wherein the runner adjustment assembly extends at least partially through the ski leg.

14. A snowmobile ski assembly comprising:
a ski defining a slot, the ski pivoting about a laterally extending ski pivot axis;
a ski runner disposed in the slot, the ski runner being translatable in the slot relative to the ski, the ski runner being translatable between a first position and a second position,
the ski runner defining an arcuate slot,
a bottom of the ski runner being closer to a bottom of the ski in the first position than in the second position; and
a runner adjustment assembly connected to the ski runner, the runner adjustment assembly selectively translating the ski runner between the first and second positions,
the ski being pivotable about the ski pivot axis relative to the runner adjustment assembly,
the runner adjustment assembly having a connector extending through the arcuate slot, the connector being movable inside the arcuate slot as the ski pivots about the ski pivot axis.

15. The snowmobile ski assembly of claim 14, wherein translation of the ski runner occurs as a result of an actuation of a single component of the runner adjustment assembly.

16. The snowmobile ski assembly of claim 14, wherein the ski runner is held in place relative to the ski by the runner adjustment assembly.

17. The snowmobile ski assembly of claim 14, wherein the ski runner remains rotationally fixed relative to the ski as the ski runner translates between the first and second position.

18. The snowmobile ski assembly of claim 14, wherein the ski has a front wall at a front of the slot and a rear wall at a rear of the slot;
wherein the ski runner has a front wall abutting the front wall of the ski and a rear wall abutting the rear wall of the ski;
wherein the ski runner translates along a translation axis between the first and second positions; and
wherein the front and rear walls of the ski, and the front and rear walls of the ski runner are parallel to the translation axis.

19. The snowmobile ski assembly of claim 14, wherein the slot extends through the ski.

20. The snowmobile ski assembly of claim 14, wherein the runner adjustment assembly is connected about the ski pivot axis.

21. A snowmobile ski assembly comprising:
a ski defining a slot;
a ski runner disposed in the slot, the ski runner being translatable in the slot relative to the ski, the ski runner being translatable between a first position and a second position,
a bottom of the ski runner being closer to a bottom of the ski in the first position than in the second position;
a runner adjustment assembly connected to the ski runner, the runner adjustment assembly selectively translating the ski runner between the first and second positions; and
a ski leg pivotally connected to the ski about a laterally extending ski pivot axis, the ski being pivotable about the ski pivot axis relative to the ski leg; and
the runner adjustment assembly being fastened to the ski leg.

22. The snowmobile ski assembly of claim 21, wherein the ski runner defines an arcuate slot;
wherein the runner adjustment assembly has a connector extending through the slot, the connector being movable inside the slot as the ski pivots about the ski pivot axis.

23. The snowmobile ski assembly of claim 21, wherein the ski runner is held in place relative to the ski by the runner adjustment assembly.

24. The snowmobile ski assembly of claim 21, wherein the ski runner remains rotationally fixed relative to the ski as the ski runner translates between the first and second position.

25. The snowmobile ski assembly of claim 21, wherein the runner adjustment assembly is connected about the ski pivot axis.

26. The snowmobile ski assembly of claim 21, wherein the ski has a front wall at a front of the slot and a rear wall at a rear of the slot;
wherein the ski runner has a front wall abutting the front wall of the ski and a rear wall abutting the rear wall of the ski;
wherein the ski runner translates along a translation axis between the first and second positions; and
wherein the front and rear walls of the ski, and the front and rear walls of the ski runner are parallel to the translation axis.

27. The snowmobile ski assembly of claim 21, wherein the slot extends through the ski.

28. A snowmobile ski assembly comprising:
a ski defining a slot;
a ski leg pivotally connected to the ski;
a ski runner disposed in the slot, the ski runner being translatable in the slot relative to the ski, the ski runner being translatable between a first position and a second position,
a bottom of the ski runner being closer to a bottom of the ski in the first position than in the second position; and
a runner adjustment assembly connected to the ski runner, the runner adjustment assembly selectively translating the ski runner between the first and second positions,
the runner adjustment assembly having:
an adjustment mechanism connected to the ski runner at a first connection; and
a housing connected to the ski leg at a second connection, the housing being connected to the adjustment mechanism at a third connection, and the housing receiving the adjustment mechanism at least in part therein;
the second connection being disposed vertically above the first connection and vertically below the third connection.

29. The snowmobile ski assembly of claim 28, wherein the ski runner is held in place relative to the ski by the runner adjustment assembly.

30. The snowmobile ski assembly of claim 28, wherein the ski runner remains rotationally fixed relative to the ski as the ski runner translates between the first and second position.

31. The snowmobile ski assembly of claim 28, wherein the ski pivots about a laterally extending ski pivot axis; and
wherein the runner adjustment assembly is connected about the ski pivot axis, the ski being pivotable about the ski pivot axis relative to the runner adjustment assembly.

32. The snowmobile ski assembly of claim 28, wherein the ski has a front wall at a front of the slot and a rear wall at a rear of the slot;

wherein the ski runner has a front wall abutting the front wall of the ski and a rear wall abutting the rear wall of the ski;

wherein the ski runner translates along a translation axis between the first and second positions; and wherein the front and rear walls of the ski, and the front and rear walls of the ski runner are parallel to the translation axis.

33. The snowmobile ski assembly of claim 28, wherein the slot extends through the ski.

34. A snowmobile ski assembly comprising:

a ski defining a slot;

a ski runner disposed in the slot, the ski runner being translatable in the slot relative to the ski, the ski runner being translatable between a first position and a second position, a bottom of the ski runner being closer to a bottom of the ski in the first position than in the second position; and a runner adjustment assembly connected to the ski runner, the runner adjustment assembly selectively translating the ski runner between the first and second positions, the runner adjustment assembly having:

a housing;

a first part disposed at least in part in the housing, the first part being rotatable relative to the housing about a rotation axis, the first part being fixed along the rotation axis; and a second part disposed at least in part in the housing, the second part engaging the first part, the second part being rotationally fixed relative to the housing, the second part being movable along the rotation axis, the second part being connected to the ski runner, one of the first and second parts having an external thread, an other one of the first and second parts having an internal thread engaging the external thread of the one of the first and second parts, rotation of the first part about the rotation axis causing the second part to move along the rotation axis, thereby causing the ski runner to translate between the first and second positions.

35. The snowmobile ski assembly of claim 34, wherein the runner adjustment assembly has:

a pair of arms connected to the second part, the ski runner being received between the arms; and a pin passing through the arms and the ski runner.

36. The snowmobile ski assembly of claim 34, wherein the runner adjustment assembly has a knob connected to the first part for turning the first part about the rotation axis.

37. The snowmobile ski assembly of claim 34, wherein the runner adjustment assembly has a position indicator disposed externally of the housing, the position indicator being connected to the second part, the position indicator being movable with the second part.

38. The snowmobile ski assembly of claim 34, wherein the ski runner is held in place relative to the ski by the runner adjustment assembly.

39. The snowmobile ski assembly of claim 34, wherein the ski runner remains rotationally fixed relative to the ski as the ski runner translates between the first and second position.

40. The snowmobile ski assembly of claim 34, wherein the ski pivots about a laterally extending ski pivot axis; and wherein the runner adjustment assembly is connected about the ski pivot axis, the ski being pivotable about the ski pivot axis relative to the runner adjustment assembly.

41. The snowmobile ski assembly of claim 34, wherein the ski has a front wall at a front of the slot and a rear wall at a rear of the slot;

wherein the ski runner has a front wall abutting the front wall of the ski and a rear wall abutting the rear wall of the ski;

wherein the ski runner translates along a translation axis between the first and second positions; and wherein the front and rear walls of the ski, and the front and rear walls of the ski runner are parallel to the translation axis.

42. The snowmobile ski assembly of claim 34, wherein the slot extends through the ski.

* * * * *